(12) United States Patent  (10) Patent No.: US 9,568,638 B2
Fitzgerald et al.  (45) Date of Patent: Feb. 14, 2017

(54) IDENTIFICATION OF NEUTRON CAPTURE FROM A PULSED NEUTRON LOGGING TOOL

(75) Inventors: John B. Fitzgerald, Cambridge (GB); Kenneth E. Stephenson, Princeton, NJ (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 933 days.

(21) Appl. No.: 13/807,681

(22) PCT Filed: Jun. 27, 2011

(86) PCT No.: PCT/US2011/042008
§ 371 (c)(1),
(2), (4) Date: Apr. 18, 2013

(87) PCT Pub. No.: WO2012/012120
PCT Pub. Date: Jan. 26, 2012

(65) Prior Publication Data
US 2013/0211724 A1 Aug. 15, 2013

Related U.S. Application Data

(60) Provisional application No. 61/360,343, filed on Jun. 30, 2010.

(51) Int. Cl.
*G01V 5/10* (2006.01)
*G01V 5/14* (2006.01)

(52) U.S. Cl.
CPC .............. *G01V 5/105* (2013.01); *G01V 5/101* (2013.01); *G01V 5/14* (2013.01); *G01V 5/10* (2013.01)

(58) Field of Classification Search
CPC combination set(s) only.
See application file for complete search history.

(56) References Cited

U.S. PATENT DOCUMENTS

| 4,092,536 | A | 5/1978 | Smith |
| 4,122,339 | A | 10/1978 | Smith, Jr. et al. |
| 4,625,110 | A | 11/1986 | Smith, Jr. |
| 5,171,986 | A | 12/1992 | Loomis et al. |
| 5,349,184 | A | 9/1994 | Wright |
| 5,374,823 | A | 12/1994 | Odom |
| 6,207,953 | B1 | 3/2001 | Wilson |
| 8,050,866 | B2 * | 11/2011 | Jacobson .......................... 702/8 |
| 9,008,969 | B2 * | 4/2015 | Stoller et al. ..................... 702/5 |
| 2006/0226351 | A1 * | 10/2006 | Stoller et al. .............. 250/269.1 |

(Continued)

FOREIGN PATENT DOCUMENTS

WO 2010135618 A2 11/2010

OTHER PUBLICATIONS

International Search Report for PCT Application Serial No. PCT/US2011/042008 dated Feb. 17, 2012.

(Continued)

*Primary Examiner* — Huan Tran
(74) *Attorney, Agent, or Firm* — David G. Matthews

(57) ABSTRACT

The present disclosure is intended to overcome the problem of hydrogen contamination of the density signal. The approach is to compute the neutron capture portion of the total gamma ray counts and subtract it from the total counts resulting in a pure inelastic gamma ray measurement.

19 Claims, 17 Drawing Sheets

(56) References Cited

U.S. PATENT DOCUMENTS

| | | | |
|---|---|---|---|
| 2006/0284066 A1* | 12/2006 | Jacobson | 250/269.6 |
| 2009/0150077 A1* | 6/2009 | Stoller et al. | 702/8 |
| 2012/0197529 A1 | 8/2012 | Stephenson et al. | |
| 2013/0214145 A1* | 8/2013 | Roscoe et al. | 250/269.3 |
| 2013/0234012 A1* | 9/2013 | Morris et al. | 250/269.6 |

OTHER PUBLICATIONS

Neuman, et al., "An Investigation of Density Derived from Pulsed Neutron Capture Measurements", SPE 56647—SPE Annual Technical Conference and Exhibition, Houston, Texas, Oct. 1999, pp. 1-8.

Odom, et al., "Applications and Derivation of a New Cased-hole Density Porosity in Shaly Sands", SPE 38699—SPE Annual Technical Conference and Exhibition, San Antonio, Texas, Oct. 5-8, 1997, 13 pages.

Odom, et al., "Improvements in a Through-Casing Pulsed-Neutron Density Log", SPE 71742—SPE Annual Technical Conference and Exhibition, New Orleans, Louisiana, 2001, pp. 1-9.

Odom, et al., "Log Examples with a Prototype Three-Detector Pulsed-Neutron System for Measurement of Cased-Hole Neutron and Density Porosities", SPE 71042—SPE Rocky Mountain Petroleum Technology Conference, Keystone, Colorado, May 21-23, 2001, 10 pages.

Odom, et al., "Shaly Sand Analysis using Density-Neutron Porosities from a Cased-hole Pulsed Neutron System", SPE 55641—SPE Rocky Mountain Regional Meeting, Gillette, Wyoming, May 15-18, 1999, 10 pages.

Examination Report for GC Application No. 2011-18720 dated Nov. 6, 2014.

Examination Report issued in related GB application GB1522034.6 on Dec. 30, 2015, 6 pages.

* cited by examiner

FIG. 10
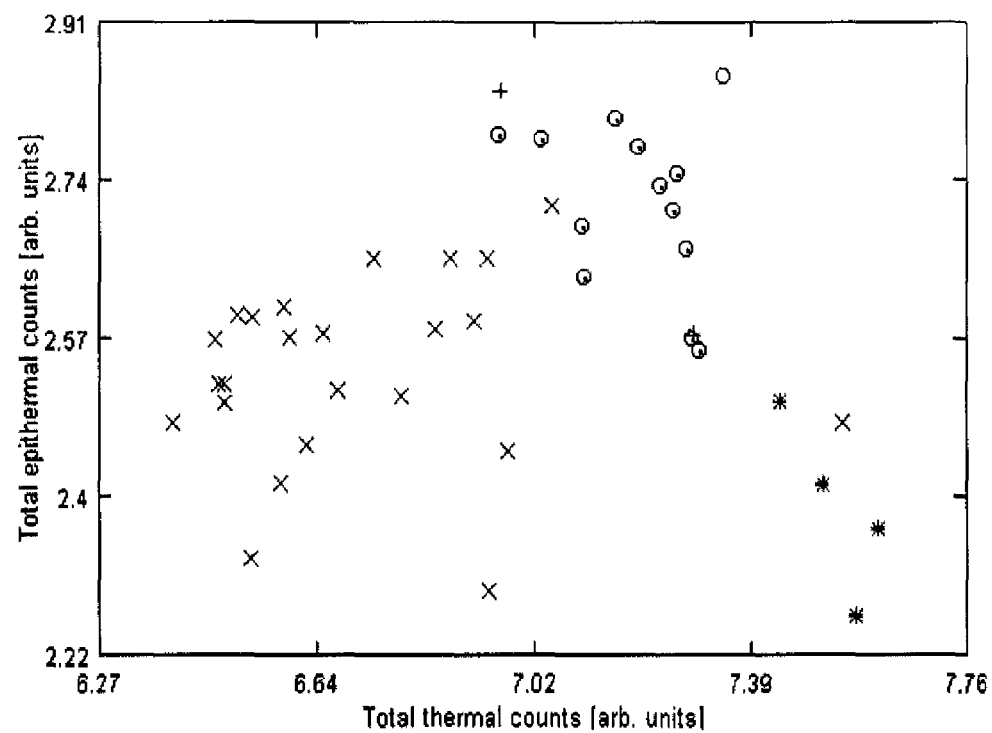
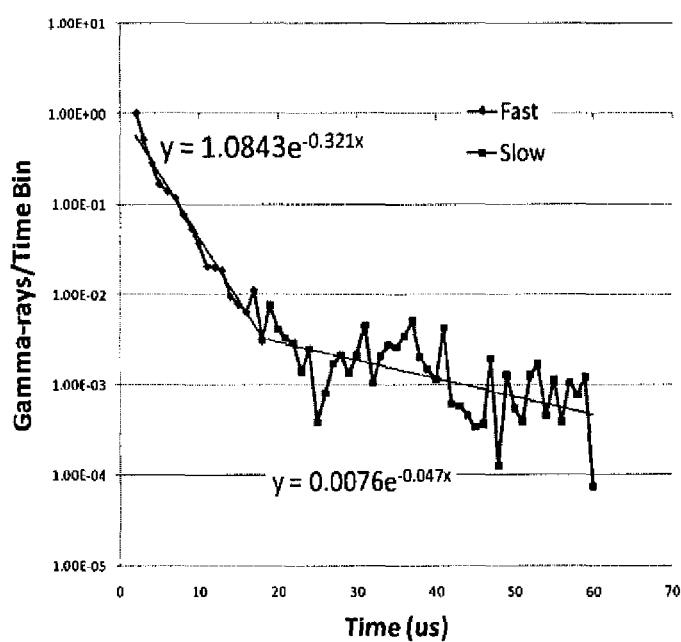
Fig. 11

IDENTIFICATION OF NEUTRON CAPTURE FROM A PULSED NEUTRON LOGGING TOOL

TECHNICAL FIELD

The present disclosure relates generally to oilfield logging and, more particularly, to oilfield logging involving inelastic gamma-ray measurements.

BACKGROUND

Many properties of a subterranean formation may be determined using different oilfield logging techniques, which may involve one or more tools having a radioisotope source. For example, to locate gas in a subterranean formation, a conventional practice combines data obtained from two tools. One of the tools is a "density" tool, which measures the electron density of the formation, and the other of the tools is a "neutron porosity" tool, which generally measures the density of hydrogen in the formation, known as the "hydrogen index (HI)." Based on measurements of formation density and hydrogen index, the porosity and pore fluid density of the formation may be determined. For a given formation fluid density, or gas saturation, a combination of a decrease in the formation density and an increase in the hydrogen index indicates an increase in the porosity of the formation. Meanwhile, for a given formation porosity, a combination of a decrease in the formation density and a decrease in hydrogen index indicates a decrease in the pore fluid density and hydrogen content. For pores filled with water and gas or oil and gas, the density and hydrogen index are an indication of the gas saturation (volume fraction of the pores occupied by gas). For pores filled with gas only, the density and hydrogen index are an indication of gas density (pressure).

The density and neutron porosity tools for measuring formation density and hydrogen index may generally employ radioisotope sources to obtain formation density and hydrogen index measurements, respectively. For example, the density tool may use a source such as $^{137}Cs$ to emit gamma-rays into a formation. Based on a count of gamma-rays scattered by the formation, the density tool may determine the electron density of the formation. Similarly, the neutron porosity tool may use a source such as $^{241}AmBe$ to emit neutrons into a formation. A count of neutrons scattered by the formation may yield a hydrogen index measurement. Such radioisotope sources may be disadvantageous in oilfield tools, as the sources may be heavily regulated by law and they can be hazardous since they cannot be shut off.

In lieu of such radioisotope sources, an electronic neutron generator may be used which will produce neutrons which, in turn, produce gamma-rays. To do so, the electronic neutron generator may emit neutrons into a formation, which may in turn produce gamma-rays via inelastic scattering and neutron capture events. A count of gamma-rays produced by inelastic scattering may generally yield a signal that is related to formation density, and a count of scattered neutrons may generally yield a neutron porosity signal that corresponds to the hydrogen index of the formation. Alternatively, a count of capture gamma-rays may generally yield a neutron porosity signal that corresponds to the hydrogen index of the formation. If it is not possible to separate the inelastic and capture gamma-rays to produce nearly independent signals sensitive to formation density and hydrogen index, respectively, then the two signals may not be used together to enable a precise determination of porosity and gas saturation.

Neutron reactions that produce gamma-rays may be separated according to the energy of the neutron. After a 14 MeV neutron has been emitted by the source, it begins to lose energy by the processes of elastic and inelastic scattering. Inelastic scattering events are typically produced by neutrons in the energy range 1-14 MeV. After neutrons have decreased in energy below approximately 1 MeV, they typically have insufficient energy to inelastically scatter; however, they continue to lose energy by elastic scattering. The decrease in energy from 14 MeV to 1 MeV happens very rapidly, in a time typically less than 1 microsecond. Inelastic scattering reactions therefore occur very quickly after the neutron leaves the source, typically in less than 1 microsecond. From approximately 1 MeV down to thermal energy (approximately 0.025 eV), neutrons decrease in energy by elastic scattering over a time interval that ranges from 2 to several microseconds, depending on the amount of hydrogen in the formation. During that slowing time, neutrons may be captured and this may lead to the emission of one or more gamma-rays. These are so-called "epithermal" capture gamma-rays. Neutrons which decrease in energy completely to thermal energy continue to elastically scatter at that energy, often for many hundreds of microseconds until they are captured and this may lead to the emission of one or more gamma-rays. These are so-called "thermal" capture gamma-rays. Since neutrons are emitted from an electronic neutron source typically in bursts no shorter than 10 microseconds, it will be appreciated that the inelastic and epithermal capture gamma-rays are emitted substantially within that 10 microsecond burst and therefore overlap in time. Thermal capture gamma-rays, on the other hand, extend into the time interval between bursts as well as during the burst.

FIG. 1 shows a crossplot of the normalized ratio of true inelastic counts of a far and near gamma ray detector on the y-axis and the normalized ratio of capture counts (40-80 microseconds after the neutron burst), both derived from modeling, where specific neutron and photon interactions of different neutron energy groups were separately tallied, which is not possible with a logging tool. What can be seen from this plot is the independence of the two axes giving a nearly orthogonal relationship between water filled porosity and gas filled porosity. This relationship is similar to the well known open-hole neutron-density log crossplot.

A complication arises due to the interaction of neutrons with hydrogen. After inelastically scattering at MeV energy, neutrons continue their scattering process in the formation, and slow down to eV and sub-eV energies mainly through elastic scattering from hydrogen. The number of low energy neutrons reaching the vicinity of the gamma-ray detector is strongly influenced by the hydrogen index, just as it is in a neutron porosity measurement. If these neutrons are captured by a nucleus in the gamma-ray detector or in the vicinity of the detector and the nucleus subsequently emits a gamma-ray that is detected by the detector, this signal will contaminate the "density" signal coming from inelastic scattering events. Indeed, it is possible for capture events to completely overwhelm the inelastic events, leading to a gamma-ray detector response which has the character of a neutron porosity measurement rather than a density measurement. It is fruitless to combine such a measurement with a neutron porosity measurement to try to identify gas because the two measurements are not independent of one another.

FIG. 2 shows a similar crossplot to FIG. 1 where on the y-axis is the normalized ratio of total counts during the initial 3 microseconds of the neutron burst and on the x-axis is the normalized ratio of capture counts as in FIG. 1. Note that the orthogonality of the two axes that is apparent in FIG. 1 no longer exists. Both axes have a significant hydrogen index response which masks the density response of the inelastic ratio, so that the measurement does not distinguish higher gas-filled porosity from lower water-filled porosity.

Data on cased hole "neutron" density measurements can be found in various SPE papers (see, e.g., SPE 71042, SPE 71742, SPE 56647, SPE 55641, and SPE 38699), but the discussion is limited to neutron capture background in terms of thermal neutron capture, without handling epithermal neutron capture. US patent application PCT/US10/35718, commonly assigned and incorporated herein by reference in its entirety, discusses design features to minimize epithermal background.

BRIEF DESCRIPTION OF THE DRAWINGS

FIG. 10 shows a plot of Epithermal counts versus total thermal capture counts per tool cycle for the near detector; compare FIG. 8 showing the dependence as representing the preferred embodiment.

FIG. 11 shows Epithermal impulse response for the RST "near" detector. The trend lines show two exponential fits.

parameterized as a function of the C-gate near/far ratio.

Figure 20:
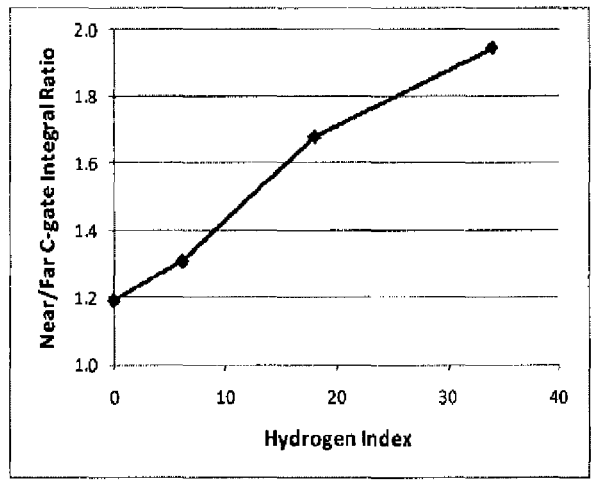

FIG. 20 shows near/Far C-gate ratio plotted against hydrogen index.

Figure 21:
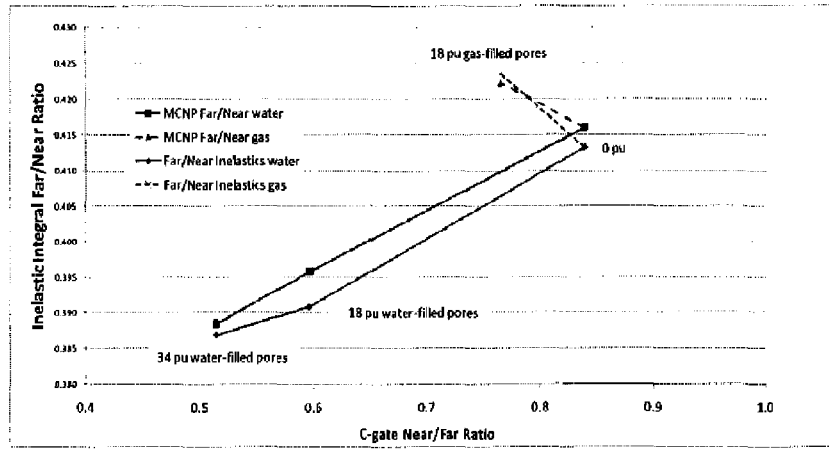

FIG. 21 shows a comparison of MCNP and inverse model of inelastic ratios.

Figure 22:
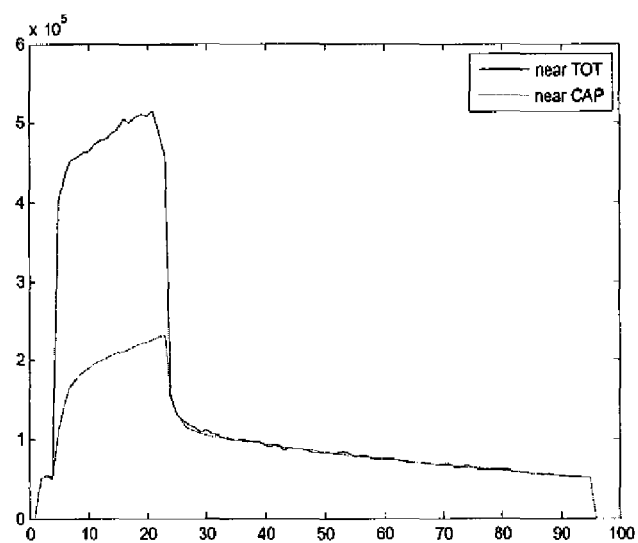

FIG. 22 shows actual log example of capture calculation for the "near" detector.

Figure 23:
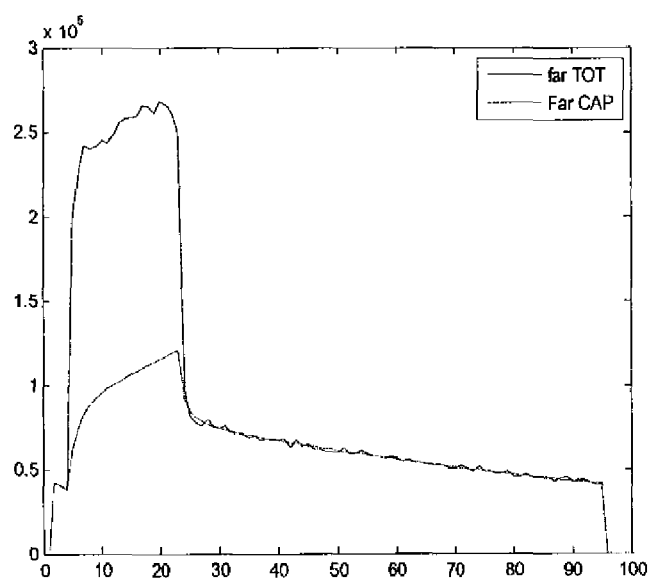

FIG. 23 shows actual log example of capture calculation for the "far" detector.

Figure 24:
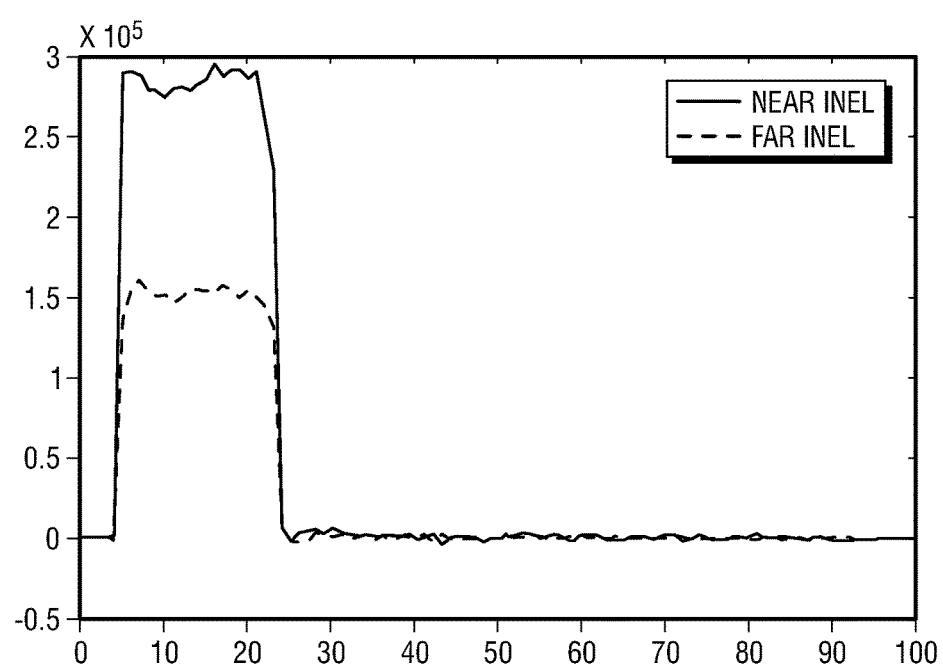

FIG. 24 shows resultant MCS spectra after capture subtraction.

Figure 25:
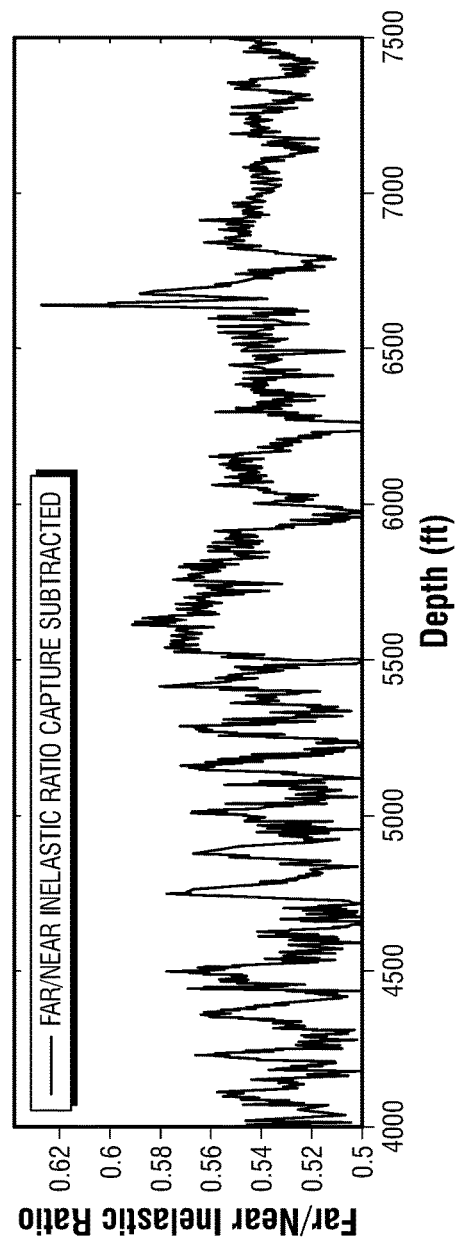
Figure 25:
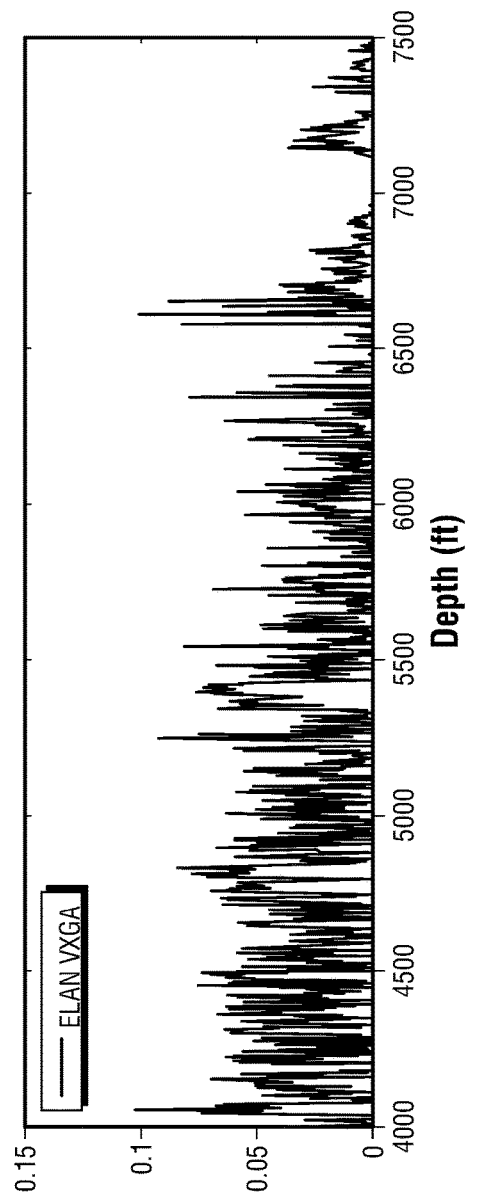

FIG. 25 shows comparison of gas signal from far/near inelastic ratio (top) vs. open-hole ELAN VXGA (volume of gas in flushed zone).

DETAILED DESCRIPTION

In the following description, numerous details are set forth to provide an understanding of the present disclosure. However, it will be understood by those skilled in the art that the present invention may be practiced without these details and that numerous variations or modifications from the described embodiments are possible.

Figure 1:
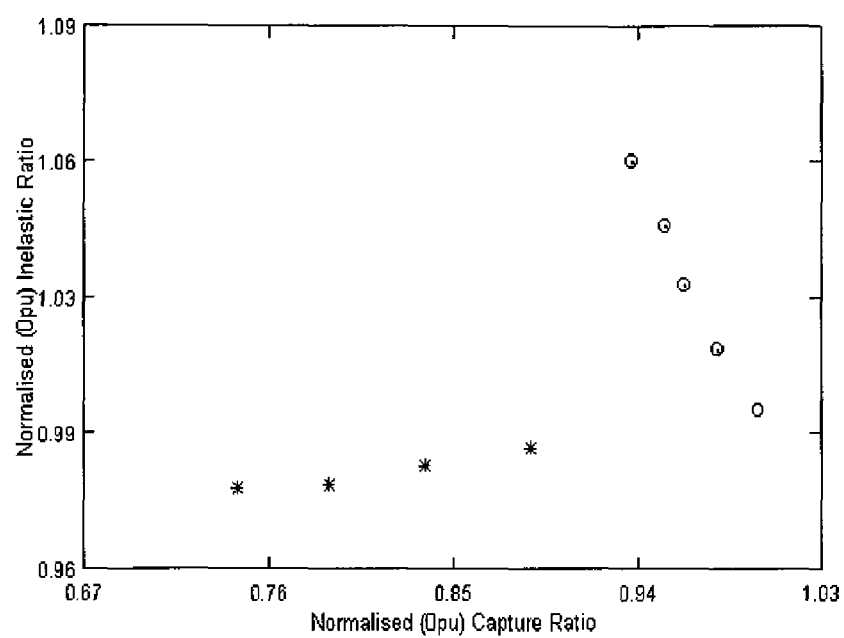
FIG. 1 shows an ideal cross-plot of normalized inelastic count-rate ratio versus capture ratio for 0 pu (empty circle), gas-filled (circles with dot) and water-filled (*) sandstone. For both water and gas points, capture ratio decreases monotonically with porosity.
Figure 2:
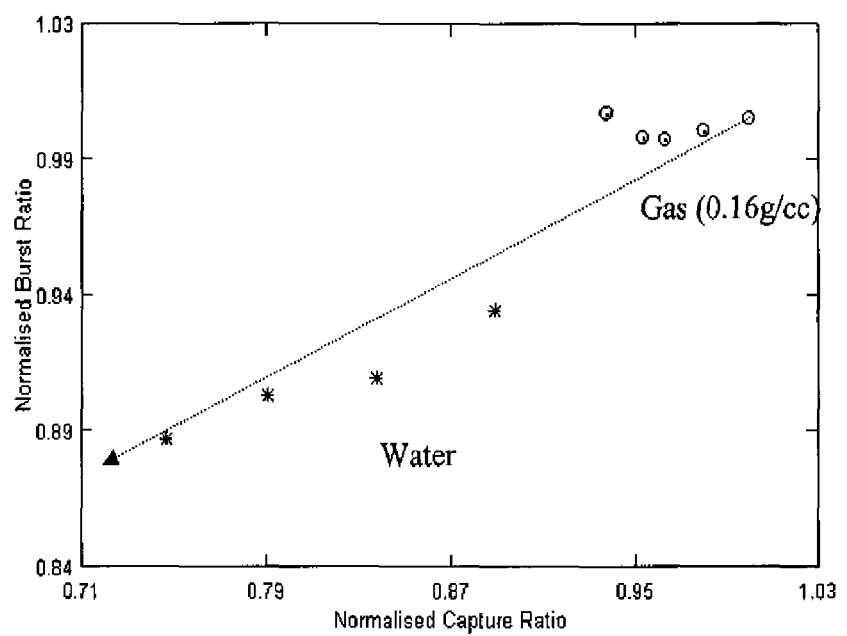
FIG. 2 shows a cross-plot of total count-rate ratio from the early neutron burst versus capture ratio.
Figure 3:
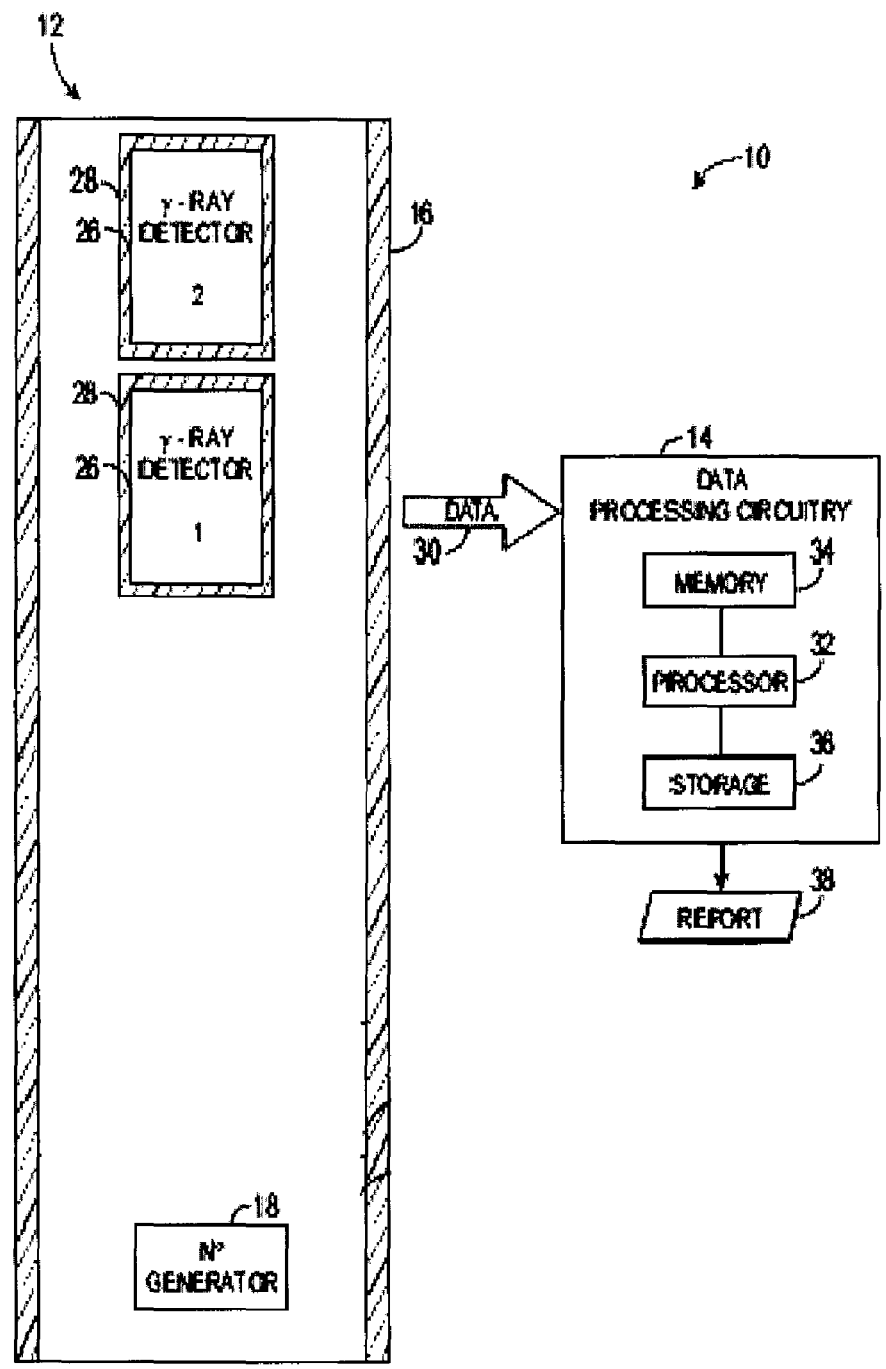
FIG. 3 is a block diagram of a well-logging system, in accordance with an embodiment.

FIG. 3 represents a measurement system 10, which may include a downhole tool 12 and associated data processing circuitry 14. Although the downhole tool 12 and the data processing circuitry 14 are depicted as independent elements in FIG. 3, it should be appreciated that the data processing circuitry 14 may be implemented entirely within the downhole tool 12, at the surface remote from the downhole tool 12, or partly within the downhole tool 12 and partly at the surface.

The downhole tool 12 may include a housing 16, within which a variety of components may reside. A neutron generator 18 may serve as a neutron source that emits neutrons of at least 2 MeV, which is believed to be approximately the minimum energy to create gamma-rays through inelastic scattering with formation elements. By way of example, the neutron source 18 may be an electronic neutron source, such as a Minitron™ by Schlumberger Technology Corporation, which may produce pulses of neutrons through d-D and/or d-T reactions. The neutron source 18 may emit neutrons of 14.1 MeV.

In general, the downhole tool 12 may include gamma-ray detector 26. In other embodiments, additional gamma-ray detectors 26 may be employed by the downhole tool 12, and are spaced two respective distances from the neutron generator 18. The gamma-ray detector 26 detects inelastic gamma-rays that are generated when fast neutrons inelastically scatter off certain elements of a surrounding subterranean formation.

The counts of gamma-rays from the gamma-ray detector 26 may be received by the data processing circuitry 14 as data 30. The data processing circuitry 14 may receive the data 30 and perform certain processing to determine one or more property of the materials surrounding the downhole tool 12, such as formation density. The data processing circuitry 14 may include a processor 32, memory 34, and/or storage 36. The processor 32 may be operably coupled to the memory 34 and/or the storage 36 to carry out the presently disclosed techniques. These techniques may be carried out by the processor 32 and/or other data processing circuitry based on certain instructions executable by the processor 32. Such instructions may be stored using any suitable article of manufacture, which may include one or more tangible, computer-readable media to at least collectively store these instructions. The article of manufacture may include, for example, the memory 34 and/or the nonvolatile storage 36. The memory 34 and the nonvolatile storage 36 may include any suitable articles of manufacture for storing data and executable instructions, such as random-access memory, read-only memory, rewriteable flash memory, hard drives, and optical disks.

The downhole tool 12 may transmit the data 30 to the data processing circuitry 14 via, for example, internal connections within the tool, a telemetry system communication downlink, and/or a communication cable. The data processing circuitry 14 may determine one or more properties of the surrounding formation. By way of example, such a property may include the formation density. Thereafter, the data processing circuitry 14 may output a report 38 indicating the one or more ascertained properties of the formation. The report 38 may be stored in memory or may be provided to an operator via one or more output devices, such as an electronic display.

The present disclosure is intended to overcome the above-mentioned problem of hydrogen contamination of the density signal. Various approaches are disclosed for identifying the neutron capture portion of the total gamma ray counts and subtract the neutron capture portion from the total counts resulting in a pure inelastic gamma ray measurement.

Capture of low energy neutrons in the vicinity of the gamma-ray detector can further be divided according to the energy of the neutrons: thermal and epithermal. Epithermal neutrons, as conventionally defined, are those with energy below the threshold to create inelastic gamma-rays but not yet in thermal equilibrium with the surrounding medium. Thermal neutrons are those that have reached thermal equilibrium with the surrounding medium. Methods for compensating inelastic measurements for thermal neutron capture background are well-known in the art and are based on the long lifetime of thermal neutrons relative to the neutron burst width of a pulsed neutron source. A fraction of the capture gamma-rays between bursts (when there are no inelastic gamma-rays present) is subtracted from the gamma-rays measured during the burst, when there are both capture and inelastic gamma-rays present. This procedure is effective at compensation for neutron capture at thermal energy, where the neutron scatters as a free neutron for a much longer than the time between neutron generator pulses. It is not effective, however, at compensating for epithermal neutron capture, which occurs during the burst and only for a very short time after the burst.

Thus, we have devised methods to compute the hydrogen-sensitive background originating from the capture of epithermal neutrons. With the epithermal background known, the "density" sensitive inelastic signal can be computed by subtracting both the epithermal and thermal neutron capture. In the prior art, only the thermal capture background was attempted to be addressed.

Detectors with a high capture cross section for epithermal neutrons are particularly sensitive to this issue. For example, the scintillator material GSO, contains gadolinium, an element with a very high cross-section for epithermal neutron capture (resonance integral=400 barns). The magnitude of the pure inelastic signal, epithermal neutron capture background and thermal neutron capture background can be modeled using nuclear modeling. Modeling performed with GSO shows that this epithermal capture can be a significant proportion of the burst-on gamma ray signal.

Figure 4:
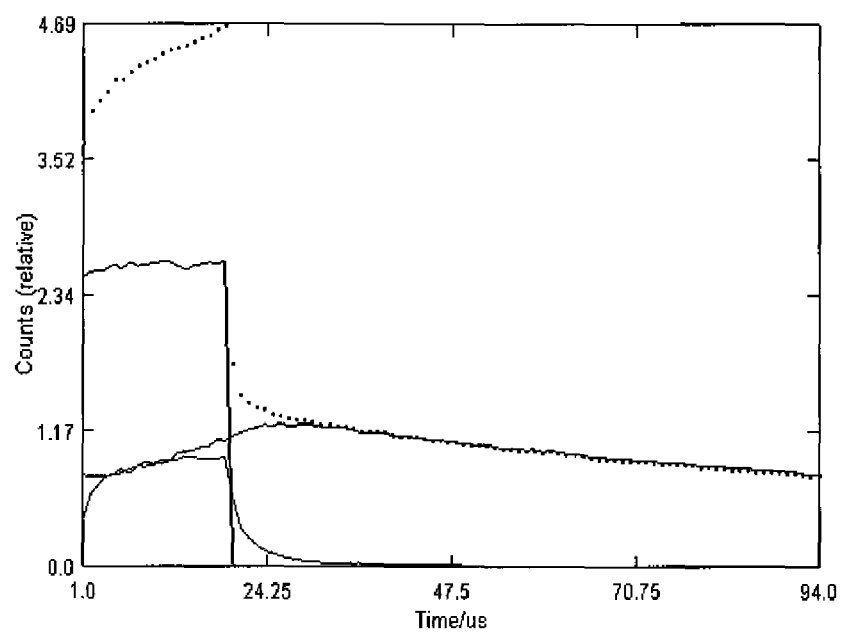
FIG. 4 shows a plot of Total counts (dotted), inelastic component (solid), epithermal component (the lowest of the peaks), and thermal capture component (the next lowest of the peaks) as a function of time.

FIG. 4 below shows the simulated total counts, and the counts decomposed into thermal capture, epithermal and inelastic scattering components, in this case for an 8 pu gas-filled sandstone formation. For the data shown, the epithermal component constitutes almost 20% of the total counts during the burst. This is almost exactly the same fraction as thermal capture component—which it is normally considered essential to subtract—which constitutes approximately 21% of the total burst counts. GSO is not the only scintillator for which epithermal capture is a significant issue. Most common scintillators used in logging tools contain elements with significant resonance integrals (I in NaI with RI=50, Br in LaBr3 with RI=89, etc.) In addition to the epithermal capture contamination caused by the scintillator, elements used in the logging tool construction such as cobalt (RI=74) in the tool housing and boron in the detector shielding (RI=280) can also contribute a significant epithermal component to the total GR counts.

While it is necessary to correct the total burst counts for thermal neutron capture in order to extract the pure inelastic GR signal that responds to formation density, it is insufficient on its own. A correction must also be made for the epithermal capture. The epithermal capture builds up quickly at the beginning of the burst and decays quickly at the end of the burst, making its shape look similar to the pure inelastic gamma-ray signal. This buildup and decay time depends on the amount of hydrogen in the formation.

Various embodiments are envisioned:

In a first embodiment, the preferred embodiment to determine the epithermal capture background is to derive it based on the relationship of total epithermal capture to the rate of new thermal creation for each burst, which can be measured with the logging tool.

Another embodiment is to fit the "burst-off" interval with a sum of exponentials with different amplitudes and decay times. The thermal and epithermal components during the "burst-on" interval are defined by the fitting parameters of the "burst-off" period.

Another embodiment is to fit the burst-on interval with a square pulse (amplitude parameter only), an exponential build-up function representing the epithermal component, and an exponential build-up function representing the thermal component.

Still another embodiment is the combination of the previous two embodiments, which will better constrain the inelastic, epithermal and thermal components than either embodiment alone.

Another embodiment is to compute the epithermal component from the total thermal count rate.

Another embodiment involves fitting the spectra obtained during the burst-on period. This method relies on having prepared "standard" spectra for each of the elements that will contribute inelastic gamma-rays (e.g., Si, Ca, Fe, 0, C, etc.), as well as the spectrum for epithermal capture. All of these spectra contribute to the total measured spectrum. The fit will determine the fraction of the total spectrum that is due to epithermal capture and allows that fraction of counts to be subtracted from the total.

The build-up and decay of the epithermal count rate during the burst is determined mostly by the amount of hydrogen in the well. The amount of hydrogen in the well affects other measurements, including "sigma" and neutron porosity. A correlation between either of these parameters can be made with the rate of buildup and decay of epithermals during the burst. With this correlation, the third embodiment described above can be used without fitting the epithermal build-up time constant, thus eliminating one of the fitting parameters.

In order to extract the inelastic counts from the total measured MCS counts, it is necessary to remove the contributions from thermal capture and epithermal capture.

The only clean measurement of any of the components is obtained from the MCS contents long after the neutron generator burst. The available sample will depend on the tool neutron pulse timing sequence, but a gate of approximately 40-80 microseconds after the burst may be typical. This provides a sample which is almost entirely due to thermal neutron capture. In certain cases with extremely low thermalization and epithermal capture rates, a very small component due to epithermal capture may survive for 10 microseconds or more after the burst. However, in typical oilfield scenarios, this will be negligibly small. Thus we can define this period as a "capture gate" as a basis for reconstructing the thermal capture rate over the entire cycle.

In order to do so, first the exponential thermal decay during the "capture gate" is fitted (for example, by a linear least-squares or other fit to the log of the counts per time bin). Such fitting is well known and commonly used to derive the exponential decay constant, which in turn can be used to derive an apparent macroscopic capture cross-section ("sigma"). This exponential component is then extrapolated forwards to a time shortly after the start of the next burst (i.e. "wrapping around" the repeating measurement cycle), and backwards to a time shortly after the end of the neutron burst. The first of these two times represents the minimum time required for a 14 MeV neutron to travel from the neutron source point to a region close to the detector and also to undergo scattering causing the neutron to be slowed to thermal energy; i.e. this is the time delay for the first thermal counts to appear after the neutron generator is turned on (in the absence of any pre-existing thermal neutron population). This time may be typically 1-3 microseconds after the start of the neutron burst. The second time is the time required for the population of thermal neutrons close to the detector to reach a maximum and begin to fall, after the neutron generator is switched off. This time will be slightly longer, and may typically last approximately 4-6 microseconds. The exact timings will depend on a number of factors, including tool geometry and detector types, and can be determined from models of the thermal neutron count rate over the cycle (see, e.g., FIG. 4); however, the thermal total is relatively insensitive to choice of values for these timings. Assuming fixed representative values will introduce negligible errors into determination of the total thermal neutron counts (see below).

The remaining section of the reconstructed thermal capture component, from shortly after the start of the neutron burst until the maximum thermal capture rate after the end of the neutron burst, is then reconstructed. The form of the rising thermal capture count rate during the burst is dependent on the rate at which new neutrons are created, which is determined by the relative neutron output of the neutron source as a function of time, combined with the rate at which the thermal population decays. The latter rate is already known from the exponential fit to the "capture gate" (above). If the neutron generator output is constant over the period of the burst, then the rate of creation of new thermal neutrons will follow a similar dependence (albeit slightly later in time, and over a somewhat variable interval due to the time taken for source neutrons at e.g. 14 MeV to reach thermal energies). As a result, the thermal neutron capture rate over the rising, non-exponential part of the cycle takes the form:

$$N(t) = A - B \cdot \exp(-t/\tau) \qquad \text{eq. (1)}$$

where t is time (in microseconds or time bins), $\tau$ is the time constant derived from fitting to the exponential decay in the "capture gate" (above), and A and B are constants which can be determined from the end point values of the reconstructed exponential fit. N is the thermal capture count rate at time t (or in time bin t).

In fact, generally a polynomial fit of appropriate order will be an adequate substitute. This may be, for example, a quadratic fit. For short neutron bursts, where the rise time for the thermal capture rate may be of the order of 10-20 microseconds (or less), a linear fit will be sufficient assuming typical decay time constants (t) as applicable to oilfield environments. For longer neutron bursts, a higher-order polynomial may be preferable. This choice can be determined by simple neutron transport modeling.

Figure 5:
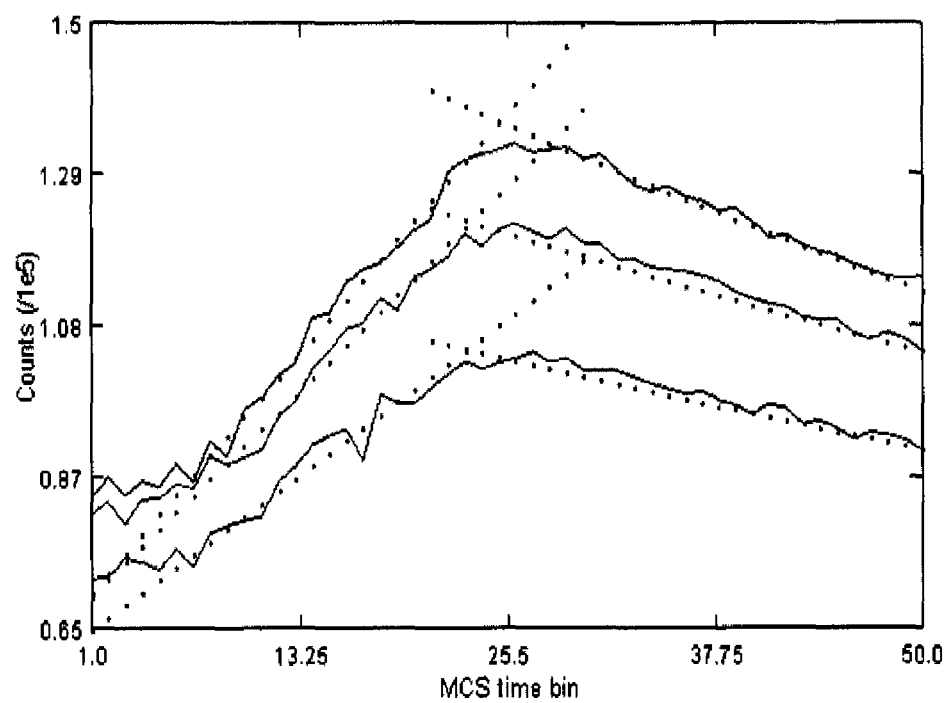
FIG. 5 shows a plot of Model-derived thermal capture counts against time for 0 pu (highest plotted line), gas— (second lowest plotted line) and water-filled (lowest plotted line) sandstone; dotted lines show fits to in-burst thermal rise (fitted using bins 7:20) and exponential decay (approx 40-80 us after the burst).

The above procedure generates a reproduction of the assumed thermal capture count rate over the cycle. This may show small deviations from time dependence of the true count rate sequence; these are detailed below, together with a discussion of the impact of each effect as well as steps to mitigate this impact:

The exact times of the points of inflection in the capture rate vary slightly for environments which result in varying rates of thermalization. For example, with an increase in hydrogen content, fast neutrons are more rapidly moderated, and therefore the thermal capture rate starts to rise more quickly after the start of the (fast) neutron burst; equally, the peak thermal rate is reached more quickly after the end of the neutron burst. FIG. 5 shows an example of the time dependence of the modeled thermal capture count rate for 3 formations of different hydrogen index, together with fits to the rising curve during the neutron burst, and to the later exponential decay; it can be seen that, for 0 pu sandstone (HI=0), these fits cross at a slightly later time.

However, modeling shows that such variations are small (of the order of 1 microsecond or less), and furthermore that variations (if any) in the times of the two points of inflection are correlated. As a result, the net effect is equivalent to a very small shift in the entire thermal capture count rate cycle to later or earlier times. Since the capture gate which is used to fit the thermal capture spectrum does not move, this is equivalent to an equal small shift in the capture gate relative to the true capture count rate sequence. As a result, a shift in timings of 1 microsecond results in an error in reconstructed total counts equivalent to the amount by which the thermal count rate decays per microsecond. The modeling shows that the timings of these points of inflection are very similar for completion geometries and environments with typical or high hydrogen content (hydrogen index).

For example, for oil- or gas-filled sandstones of porosity of a few pu or above; the timing does not become faster at higher hydrogen index (HI). At very low HI, e.g., for pure $SiO_2$ of zero porosity and zero shale or other content—which in any case is very rare in practice—the models suggest a very small shift to later times (of the order of 1 microsecond). Conveniently, at such low HI, the macroscopic capture cross-section $\Sigma$ is very small (e.g., 4.3 c.u. for $SiO_2$), and as a result, the thermal capture decay time constant $\tau$ is large. This means that the decay per microsecond is very small; for example, for pure $SiO_2$ or dolomite of 0 pu porosity, the thermal capture count rate would be expected to decay by less than 0.1% per microsecond. Therefore, in order to correctly determine the total thermal capture counts per tool cycle, it is unnecessary to correct for this small shift in timing; instead, it will be sufficient to use typical timings for environments with non-zero HI. For zero or near-zero HI, the reconstructed thermal capture time sequence will show a small offset in time, but the total counts will be unchanged to a very good approximation.

The reconstructed thermal capture sequence shows a discontinuity in gradient at the points of inflection, whereas the measured curve shows smoother, more rounded maximum and minimum. However, the change in gradient is nevertheless rapid (over at timescale of the order of a microsecond, which is negligible for typical measurement time bins of around a microsecond or longer), so that the difference in counts between true thermal capture rate and reconstructed rate will be small; and additionally, the errors at the maximum and minimum count rate will be of opposite sign and therefore largely cancel, so that the net resultant error in the thermal capture count rate total over a tool cycle is negligible.

The fitted "capture gate" may, in certain environments, contain a small admixture due to a long tail from epithermal neutron capture (in general, most epithermal neutrons are thermalized within a few microseconds after the end of the neutron generator burst). This contamination is minimized by an appropriate choice of time gate; later gates contain detector counts which are more purely thermal capture. Alternatively, it is possible to make a small correction to the total counts during the "capture gate" in order to account for a small proportion of epithermal counts. This can be dependent on the rate at which neutrons are moderated from epithermal to thermal energies, using a measure such as hydrogen index (which can simultaneously be derived from a near-far capture gate ratio for the case of two or more detectors). Such a dependence can be derived by modeling the epithermal count rate during the chosen time gate. However, in most cases, with a suitable chosen capture gate, it is negligibly small.

Figure 6:
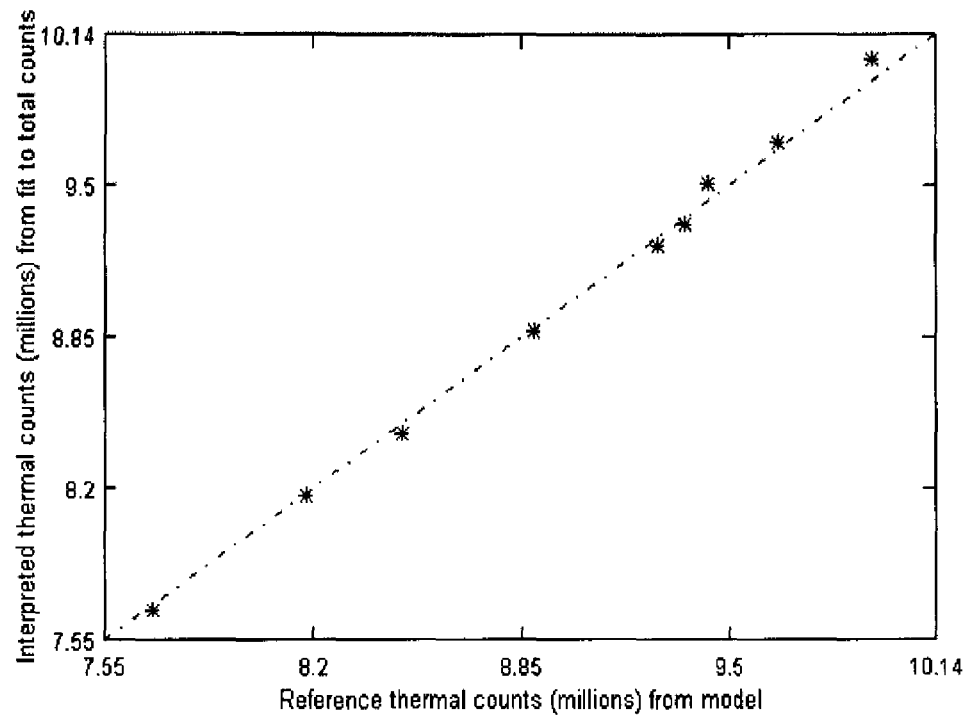
FIG. 6 shows a plot of the Interpreted total thermal counts (from fit to modeled total MCS, capture gate only) against reference thermal counts (extracted directly from the Monte Carlo model) for 0 pu, water-filled and gas-filled sandstone (one-to-one line shown dashed).

Integrating the reconstructed synthetic thermal capture count-rate sequence thus provides the total thermal capture counts over the tool pulse cycle. The high quality of this reconstructed total is demonstrated in FIG. 6, which plots the interpreted total capture counts over the cycle (using the reconstruction from the capture gate sample only) against the equivalent thermal capture total extracted directly from the Monte Carlo model. For each point, the interpreted and reference values are based on exactly the same simulated events. The points shown correspond to water-filled and gas-filled sandstones with porosities in the range 0-20 pu. The rms relative error between the interpreted capture total derived by fitting the total MCS and the reference capture total from the model is approximately 0.5%.

Having thus determined the total number of thermal capture gamma-rays per tool cycle, it is possible to derive an estimate of the number of thermal capture events taking place per tool cycle, noting that, traditionally, the fraction of thermal neutrons which do not contribute to the gamma-ray spectrum because they travel far from the detector is characterized by diffusion. Ultimately, of course, these thermal neutrons are also captured, but this happens far from the detector so that the gamma-rays are not detected. The division of thermal neutrons into capture and diffusion is a simplified account of a complex process which has a number of dependencies (e.g., on hydrogen index, geometry, macroscopic capture cross-section etc.), but nevertheless these terms do reflect an apparent split into that part of the thermal neutron population which results in a capture gamma-ray count, and that part which does not.

The total loss rate of thermal neutrons (considering only the population of neutrons within the contributing "region of importance" for the detector), characterized by the thermal gate (e.g., 40-80 microseconds after the burst) decay time constant $\tau$, is due to the following processes: capture ($\Sigma_{capt}$, $\tau_{capt}$), both in the borehole ($\Sigma_{bh}$, $\tau_{bh}$) and in the formation ($\Sigma_{for}$, $\tau_{for}$) and loss to diffusion (neutron leaves "region of importance" before creating a $\gamma$-ray; $\tau_{diff}$).

Therefore, $$\frac{1}{\tau} = \frac{1}{\tau_{capt}} + \frac{1}{\tau_{diff}} \qquad \text{eq. (2)}$$

$$= \frac{1}{\tau_{bh}} + \frac{1}{\tau_{for}} + \frac{1}{\tau_{diff}}$$

Noting that this thermal gate reflects the "fast decay" component for thermal die-away. For a water-filled borehole with low-porosity clean formation (and low-salinity pore fluid), $\Sigma_{bh} > \Sigma_{for}$, so that the fast component is borehole capture. Formation capture will dominate after at least 100-200 μp. In this case, $$\frac{1}{\tau_{capt}} = \frac{1}{\tau_{bh}} + \frac{1}{\tau_{for}} \approx \frac{1}{\tau_{bh}} \qquad \text{eq. (3)}$$

For the modeled environments (water filled borehole and formation of porosity in the range 0-20 pu), the total decay time constant $\tau$ is increases with formation hydrogen index HI. This means that increasing the hydrogen content results in longer-lived thermals. In other words, the main contributor (from the formation) to the loss of thermal neutrons is not capture (for which the decay would be faster with increasing HI), but diffusion, which is hampered by increasing hydrogen thermal scatterers.

Therefore, in these cases the formation capture contribution is small compared to both borehole capture and diffusion.

At equilibrium, the average number of thermal neutrons created per tool cycle must be balanced by an equal number of thermal neutrons lost on average per cycle (to formation and borehole capture and to diffusion). For a population $N_N$ of thermal neutrons (considering only the population within a "region of importance" for the given detector), the total instantaneous rate of loss of thermal neutrons is governed by $$\frac{dN_N}{dt} = -N_N \Sigma_{tot} v_N \qquad \text{eq. (4)}$$

where $\Sigma_{tot}$(c.u.)=4545/$\tau$ and $v_N$ is the neutron velocity.

However, thermal neutrons which are lost to diffusion do not create capture γ-rays and therefore do not contribute to detector counts (although diffusion loss is reflected in the decay constant τ extracted from a fit to the thermal decay gate, which relates to the rate of decrease in the thermal neutron population). The rate at which thermal neutrons are lost to capture is governed by:

$$\left(\frac{dN}{dt}\right)_{capt} = -N_N \Sigma_{capt} v_N, \qquad \text{eq. (5)}$$

and therefore the fraction of the total loss rate of thermal neutrons which is accounted for by capture is given by:

$$\left(\frac{dN}{dt}\right)_{capt} / \left(\frac{dN}{dt}\right)_{tot} = \frac{\Sigma_{capt}}{\Sigma_{tot}} = \frac{\tau}{\tau_{capt}} \qquad \text{eq. (6)}$$

Therefore, the total rate of loss of thermal neutrons=($\tau_{capt}$/τ)×thermal capture rate.

For a fresh-water filled borehole of constant geometry (eg fixed CSG OD & ID as well as BHS), $\tau_{bh}$ is constant and small compared to $\tau_{for}$, so that $\tau_{capt} \approx \tau_{bh}$=constant, so that this general relationship can be reduced to:

$$\frac{\Sigma_{capt}}{\Sigma_{tot}} \propto \tau \qquad \text{eq. (7)}$$

Thus we deduce that the number of thermal neutrons lost to either capture or diffusion per cycle is proportional to ($\tau_{capt}$/τ)×thermal capture gamma-ray counts per cycle, since the thermal capture gamma-ray count rate is proportional to the rate at which thermal neutrons are captured (those too far from the detector to contribute are excluded as part of thermal diffusion). Since, once the tool reaches operating equilibrium, the number of thermal neutrons, averaged over a cycle, is constant (other than statistical variations, neutron generator output variations and changes in formation or other environmental properties), this also gives us the number of thermal neutrons created each cycle. Thermal neutrons are born from epithermal neutrons which are moderated further to thermal energies, and therefore the rate at which thermal neutrons are being created indicates the rate at which epithermal neutrons are being lost.

Furthermore, all epithermal neutrons arising from a given neutron generator burst are thermalized (or captured) well before the next neutron burst, for typical tool time sequences with at least several tens of microseconds between bursts, as also required in order to observe the thermal decay properties as described above. Therefore, the number of epithermal neutrons lost per burst is also equal to the number of epithermal neutrons created per burst. This assumes that losses of epithermal neutrons to other processes, analogous to the thermal diffusion component, are small. This is because, unlike thermal neutrons which may have lifetimes of several hundred microseconds or more, epithermal neutrons typically survive only a few microseconds before thermalization (or capture); in this short lifetime, they travel only a short distance as their velocity is relatively low. Thus it is reasonable to assume that the number of epithermal neutrons produced per tool cycle in the detector "region of importance" is equal to (or at least proportional to) the number of thermal neutrons produced per cycle, as computed from the thermal capture gamma-ray count rate (above).

Finally, we consider the relationship between the epithermal capture gamma-ray count rate and the number of epithermal neutrons produced per cycle. In general, a longer lived epithermal population means that the average epithermal neutron flux is greater for the same total number of epithermal neutrons produced per cycle. Thus we may expected a dependence on hydrogen index (since increased hydrogen abundance implies more rapid moderation to thermal energies and therefore a shorter lived epithermal population) as well as capture cross-section. Such a dependence is also seen for the thermal capture rate as above. In the case of the epithermal population, the dependence may be lessened since epithermal neutrons in any case typically live for a short time and do not travel far; thus the exposure of epithermal neutrons in or near the detector crystal (where most epithermal capture gamma-rays are generated) to the formation properties may be limited. In other words, many of the epithermal neutrons which result in epithermal background may be relatively insensitive to the variable formation properties. Nevertheless, we note that there can be expected to be some dependence, however weak, of the epithermal gamma-ray count rate on the formation hydrogen index and capture cross-section in an analogous manner to that of the thermal capture gamma-ray count rate.

The variations in both epithermal and thermal capture gamma-ray count rates, for different typical oilfield completion environments, can be responsible for large errors in the deduced "inelastic" (or in-burst) count rates, if uncorrected. Nevertheless, the variations are, in relative terms, moderate; for example, the data shown in FIGS. 6 (thermals) and 7 (epithermals) show variations in count rates by a factor of around 2, rather than by orders of magnitude. As a result, for such variations, it is reasonable to combine the dependences (for both epithermal and thermal capture gamma-ray rates) on hydrogen index and capture cross-section into a single linear relationship.

Thus we combine the following relationships:

number of epithermal neutrons created per tool cycle = rate of loss of epithermal neutrons = rate of creation of thermal neutrons = rate of loss of thermal neutrons = ($\tau_{capt}/\tau$) × thermal capture gamma-ray rate and epithermal capture count rate=$f(\tau,\tau_{capt})$×epithermals created per tool cycle to yield epithermal capture count rate=$k \times (\tau_{capt}/\tau) \times$thermal capture count rate  eq. (8)

where k is a constant (to be determined).

Note that, strictly, the time constants $\tau_1$ and $\tau_{capt}$ appearing in the relationship for epithermal count rate are not the same as those used for thermal neutrons; nevertheless, as the variation will in general be small, and as there will be a strong correlation (with most of the dependence commonly directly dependent on hydrogen index), the use of a single factor of thermal ($\tau_{capt}/\tau$) is appropriate.

In any case, since a precise value for the apparent near borehole (or fast) time constant $\tau_{capt}$ is difficult to compute theoretically, and since this parameter is generally constant for a given borehole geometry and borehole fluid, in practice this result reduces to:

$$\text{epithermal capture count rate} = K \times (1/\tau) \times \text{thermal capture count rate} \quad \text{eq. (9)}$$

where K is a constant to be determined from model-based calculations of the dependence of epithermal count rate and thermal count rate. Detailed Monte Carlo approaches can give extremely good agreement with measured count rates for such tools, and can be verified by comparing, for example, spectroscopically determined epithermal and thermal gamma-ray yields for particular elements with strong epithermal or thermal capture signature lines. Thus, with appropriate advanced modeling approaches, a reliable determination of the constant K, for a given completion geometry and environment, can be obtained. As before, $\tau$ is determined empirically from a fit to the thermal decay time gate which may typically be 40-80 microseconds after the neutron burst.

Note that, as K is proportional to $\tau_{capt}$ as well as possible weaker dependences on epithermal capture cross-section and lifetime, it is expected that K will depend on the borehole and near-borehole apparent capture cross-sections. Thus, for a change in borehole or casing size, or a change in borehole fluid (e.g., salinity), a different proportionality constant would be expected. A determination of the relationship between epithermal count-rate and $(1/\tau) \times$ thermal count-rate should be made for each completion geometry and borehole fluid.

Figure 7:
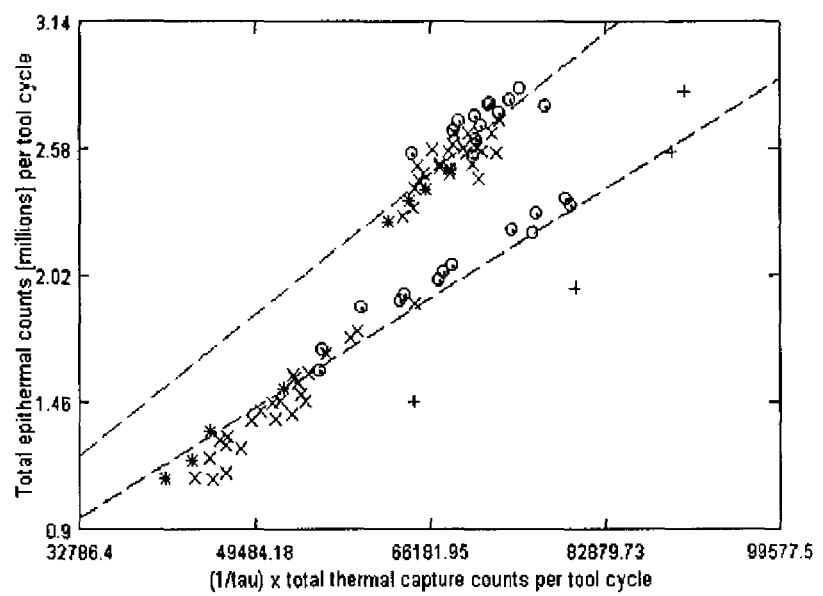
FIG. 7 shows a plot of Total epithermal counts against total new thermals per cycle (from model).

The main advantage of this method of correction is that there is a simple relationship between the total epithermal counts per cycle and the total thermal counts per tool cycle. FIG. 7 shows this relationship for a variety of formations: water—(symbol: *) and gas-filled (symbol: circled dots) clean sandstone of varying porosity (0 pu: empty circle) and with various gas densities, as well as with shale (symbol: x) at fractions Vsh=10-40%. In addition, there are two points with the borehole filled with high-salinity 200 ppk NaCl brine (symbol: +). The upper curve is for the near detector, and the lower curve is for the far detector. Since detector size has a different impact on epithermal and thermal detection efficiency, the relationship will depend on each detector properties. As predicted by the relationship derived above, replacing fresh water in the borehole by high salinity NaCl brine results in the points lying on a different line; this is expected, because the high capture cross-section for Chlorine has dramatically increased the apparent borehole capture cross-section, and therefore decreased $\tau_{capt}$. As a result, the epithermal points now lie lower, compared to the fresh water borehole points, as suggested by the relationship:

$$\text{epithermal count rate} = (\tau_{capt}/\tau) \times \text{thermal capture count rate} \quad \text{eq. (10)}$$

Because the apparent borehole capture cross-section is not the same as the borehole fluid cross-section (it also includes casing, tool, cement, near formation etc.), it is not possible to simply scale $\tau_{capt}$ according to the reference macroscopic capture cross-sections for fresh water and 200 ppk NaCl brine; this proportionality will in general need to be calibrated by reference to modeled or measured data.

While it is not a universal relationship, the relationship is nearly linear for water filled, gas filled and shaly sandstones for a given logging tool detector configuration and borehole/completion configuration. For the data shown (excluding the two points for high salinity borehole fluid) the rms error between the epithermal total counts derived from the thermal capture counts using the new algorithm, and the epithermal total for each point (derived directly from the Monte Carlo model), is approximately 1% of the total in-burst counts (compare to an epithermal total of approximately 20% of in-burst counts when uncorrected).

A computation of true inelastic counts can then be generated from the total detector counts versus time spectrum. The true inelastic counts are computed by determining and subtracting the capture component, and then subtracting the epithermal component derived from the thermal count rate distribution as described above.

The relationship between total epithermal counts and total thermal counts will be altered somewhat with changes in borehole and formation salinity, and completion geometry, as reflected in the more general relationship:

$$\text{epithermal } \gamma\text{-ray count rate} \propto (\tau_{capt}/\tau) \times \text{thermal capture } \gamma\text{-ray count rate} \quad \text{eq. (11)}$$

Equation 11 accounts for the different proportionality constant for epithermals as a function of thermal capture counts observed when the borehole fluid is 200 ppk NaCl, or when the casing or borehole dimensions change.

Similarly, for scenarios where the formation capture contribution to the fast thermal decay gate (e.g., 40-80 microseconds after the burst) is not negligible, the total apparent macroscopic capture cross-section (or time constant) should also be included.

Changes in borehole and formation salinity can be measured with the thermal capture decay curve and used to determine the correct relationship between the total epithermal neutrons and thermal neutrons. This relationship will depend on logging tool geometry, completion geometry and borehole salinity. Nuclear modeling is used to parameterize this relationship so that the relationship for any borehole completion type and borehole salinity combination can be determined.

Figure 8:
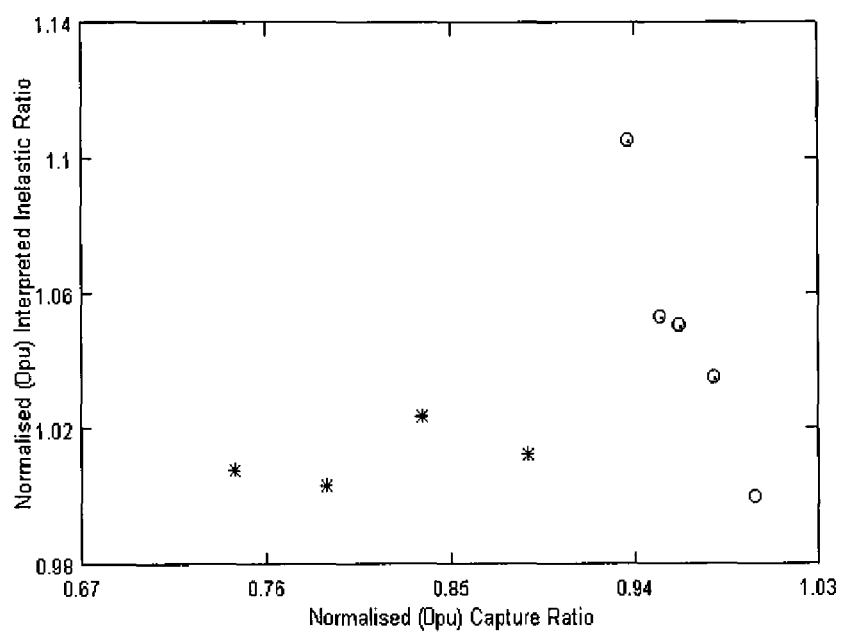
FIG. 8 shows a cross-plot of normalized interpreted inelastic count-rate ratio, obtained by applying the new thermal and epithermal correction algorithm to modeled total MCS counts, versus capture ratio for 0 pu (empty circle), gas-filled (circles with dot) and water-filled (*) sandstone.

An example of the correction is shown in FIG. 8. Shown is the result of the epithermal and thermal capture corrected inelastic GR counts determined from the modeled total counts for different water and gas filled porosities. Note the improved separation of the water and gas filled lines compared to the uncorrected counts. This will allow a much improved computation of gas saturation and total porosity from a logging tool measurement of corrected inelastic ratio and capture ratio This method is sensitive to the squareness of the neutron generator burst, the preciseness of the neutron burst timing and the non-exponential behavior of the capture component in the beginning of the neutron burst and immediately after the neutron burst.

There is a link between the epithermal neutron population and the total thermal population, but it is not a simple link and corrections must be made for variations in the thermal neutron capture cross-section of the formation and the borehole and variations in neutron diffusion in different environments.

$$\text{Epithermal } GR \text{ component} = f(\text{total thermal counts}, BH \text{ sigma}, \text{formation sigma}, \text{borehole geometry}) \quad \text{eq. (12)}$$

The exact functional form would be dependent on the specific geometry of the logging tool and the function would need to be parameterized for different borehole sizes and casing sizes with nuclear modeling. This method is sensitive to the large variations in capture cross-section and diffusion for different conditions.

Figure 9:
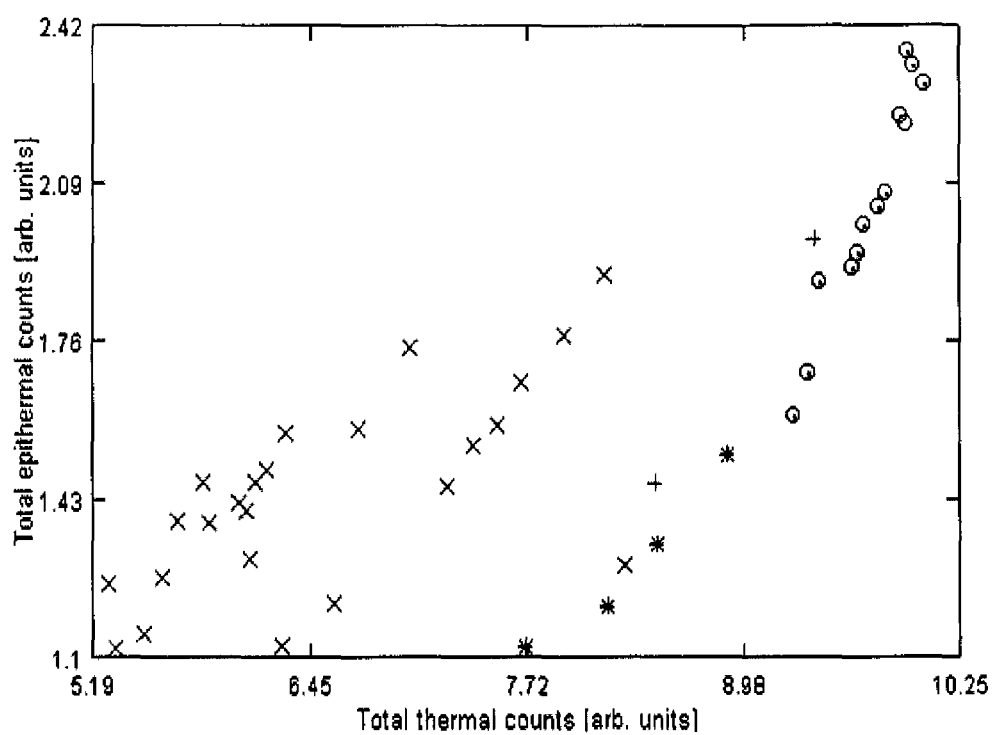
FIG. 9 shows a plot of Epithermal counts versus total thermal capture counts per tool cycle for the far detector; compare FIG. 8 showing the dependence as representing the preferred embodiment.

FIGS. 9 and 10 below show the epithermal count rate plotted against the thermal count rate, for the far and near detectors respectively. The data plotted span the same completion geometries and environments (formation composition, borehole fluid and other materials) as plotted in FIG. 7. Note the dramatically superior correlation between the epithermal count rate and $(1/\tau) \times$ thermal count rate as plotted in FIG. 7.

Another embodiment of a method of determining the epithermal capture background in a GR detector is through analysis of the energy spectrum of the gamma rays. Different elements will emit gamma rays with different energy spectra when capturing an epithermal or thermal neutron. The relative amounts of different elemental capture can be solved for by identifying the spectra of individual elements and solving for them. Since epithermal and thermal capture can be a significant percentage of the total GR counts during a neutron burst, the spectra can be solved for and subtracted from the total counts leaving inelastic spectra only. An example of this would be solving for Gd capture spectra when using a GSO detector, which would be coming primarily from the epithermal capture in the detector.

Determination of the epithermal capture component in a pulsed neutron tool may also be useful as a measurement in itself. The epithermal neutron capture counts can be used to compute a hydrogen index measurement or a neutron porosity measurement either by relating the epithermal capture counts measured in a single detector or by relating a ratio of epithermal counts in two or more detectors to water filled porosity. An epithermal slowing-down-time measurement can be determined by the fitting method described above. This measurement can be used to determine the standoff of the logging tool in the borehole.

The hydrogen concentration in the formation affects the rate of energy loss of neutrons from MeV energy down to thermal energy. It also affects the distance that neutrons travel from the source in the course of slowing from MeV energy to thermal energy. This dependence of the distance traveled from the source to the point of reaching thermal energy is commonly used to determine "neutron porosity", which is approximately the same as hydrogen index. Frequently, two detectors at different spacings from the neutron source are used, and the ratio of thermal capture gamma-rays in the two detectors is calibrated in terms of porosity, or hydrogen index. Since the rate of buildup and decay of epithermal neutrons at the start and end of the burst, respectively, is also dependent on hydrogen index, the buildup and decay can be calibrated in terms of the thermal gamma-ray ratio from the two detectors. This fixes the epithermal buildup and decay in embodiment (3) so that these are no longer free parameters.

In addition to the mathematical methods described above, we also present a physics based model to separate inelastic and capture gamma-ray components. If we consider a very short time impulse emission of neutrons from the source, a high rate of energy loss will produce a rapid decay rate of the epithermal neutron population and a correspondingly rapid increase in the thermal neutron population. A low rate of energy loss will produce a slower decay rate of the epithermal neutron population and a correspondingly slower increase in the thermal neutron population. In other words, the feed rate of the thermal flux is proportional to the time derivative of the epithermal flux. If we assume that the epithermal neutron flux due to an impulse emission from the neutron source is a sum of two exponentials, then $$\phi_{EPI} = A_1 e^{-\alpha_1 t} + A_2 e^{-\alpha_2 t}. \qquad \text{Eq. 13}$$

While there are at least two exponentials involved in the description of the epithermal neutron flux (one for the slowing down from the free hydrogen scattering region from 0.1 MeV to 5 eV and one from the molecular scattering region from 5 eV to thermal), one of these processes may dominate and allow a single exponential approximation. However, for now we will carry both exponentials in the description. Note that in this approximation the two processes are considered to be additive rather than sequential. Neutrons in the free hydrogen scattering region may drop directly to near thermal and these are represented by the fast exponential. Those neutrons that drop to the molecular scattering region will be dominated by the long time constant exponential. Capture gamma-rays will be generated by both the fast and slow populations and have fast and slow exponential decay times, respectively. Additional exponential decays can be incorporated in a similar way.

The time rate of decay of the epithermal flux is the rate that is feeding the thermal flux:

$$\frac{d\phi_{EPI}}{dt} = -(\alpha_1 A_1 e^{-\alpha_1 t} + \alpha_2 A_2 e^{-\alpha_2 t}) \qquad \text{Eq. 14}$$

The thermal population gain due to loss from the epithermal energy group in a short time $\Delta t$ is just:

$$\Delta \phi_{THERMAL\_gain} = (\alpha_1 A_1 e^{-\alpha_1 t} + \alpha_2 A_2 e^{-\alpha_2 t}) \Delta t \qquad \text{Eq. 15}$$

We assume that an injection of neutrons from the epithermal population over a very short time interval (i.e., an "impulse" injection) into the thermal population will result in an exponentially decreasing thermal flux:

$$\phi_{THERMAL\text{-}impulse} = B e^{-\beta t} \qquad \text{Eq. 16}$$

The thermal neutron flux for an impulse injection of 14 MeV neutrons is a convolution of the thermal feed rate ("g") in Eqn 15 with the thermal impulse response ("f") in Eqn 16:

$$\phi(t) = \int_0^t g(t') f(t-t') dt' \qquad \text{Eq. 17}$$

Substituting Eqn 15 and Eqn 16 and into Eqn 17 and integrating, we arrive at the thermal response for an impulse of neutrons from the 14 MeV source:

$$\phi_{THERMAL-source\_impulse} = \qquad \text{Eq. 18}$$
$$\frac{B\alpha_1 A_1}{(\alpha_1 - \beta)}(e^{-\beta t} - e^{-\alpha_1 t}) + \frac{B\alpha_2 A_2}{(\alpha_2 - \beta)}(e^{-\beta t} - e^{-\alpha_2 t})$$

Now we must consider that the neutron source function is not an impulse but a pulse of several microseconds. Typically the pulse is almost constant in amplitude but it may also have exponentially decreasing amplitude. Thus, the source flux of 14 MeV neutrons during the pulse has the form:

$$\phi_{14MeV\text{-}pulse} = \Gamma e^{-\gamma t} \qquad \text{Eq. 19}$$

The pulse may droop by ~4% over 20 μs, so $\gamma \sim 2e\text{-}3/\mu s$. Applying Eqn. 17 again with "f" given by Eqn. 19 and "g" given by Eqn. 18 gives, for times up to the end of the burst $\tau_e$:

$$\phi_{THERMAL-source\_pulse} = \qquad \text{Eq. 20}$$
$$\frac{\Gamma B\alpha_1 A_1}{(\alpha_1 - \beta)}\left[\frac{(e^{-\gamma t} - e^{-\beta t})}{(\beta - \gamma)} - \frac{(e^{-\gamma t} - e^{-\alpha_1 t})}{(\alpha_1 - \gamma)}\right] + \ldots$$

where the . . . indicates a similar term with $A_1$ and $\alpha_1$ replaced by $A_2$ and $\alpha_2$, respectively.

For times after the end of the burst $t_e$ we have:

$$\phi_{THERMAL-source\_pulse} = \qquad\qquad \text{Eq. 21}$$

$$\int_0^{t_e} \Gamma\left[\frac{B\alpha_1 A_1}{(\alpha_1 - \beta)}\left(e^{-\beta t}e^{(\beta-\gamma)t'} - e^{-\alpha_1 t}e^{(\alpha_1-\gamma)t'}\right) + \ldots\right]dt' =$$

$$\frac{\Gamma B\alpha_1 A_1}{(\alpha_1 - \beta)}\left(\frac{e^{-\gamma t_e}e^{-\beta(t-t_e)} - e^{-\beta t}}{(\beta - \gamma)} - \frac{e^{-\gamma t_e}e^{-\alpha_1(t-t_e)} - e^{-\alpha_1 t}}{(\alpha_1 - \gamma)}\right) + \ldots$$

where again, the . . . indicates a similar term with $A_1$ and $\alpha_1$ replaced by $A_2$ and $\alpha_2$.

When another neutron pulse comes along before all of the neutrons have had a chance to be captured the MCS spectra shows a phenomenon called "wrap-around". This is a buildup of thermal neutrons from previous pulses. If we let $t_p$ be the period of pulsing and assume that only thermal neutrons participate in wrap-around (i.e., no epithermal neutron contribution), then the first pulse wrap-around occurs when t in Eqn. 17 is replaced by $t+t_p$; the second occurs when t is replaced by $t+2t_p$, the third when t is replaced by $t+3t_p$, and so on. To take wrap-around into account, we must multiply Eqn. 21 by the following factor:

$$f_w = 1 + e^{-\beta t_p}\lfloor 1 + e^{-\beta t_p}\lfloor 1 + e^{-\beta t_p}\lfloor 1 + e^{-\beta t_p}\lfloor 1 + e^{-\beta t_p}[1 + \ldots]\rfloor\rfloor\rfloor\rfloor \qquad \text{Eq. 22}$$

The number of terms required in Eqn. 22 will depend on the rate of decay of thermal neutrons in the materials surrounding the detector, but at least 10 terms should be used. Other than a constant offset that is observed when using this model, this is the full thermal neutron model. Some of the terms have interesting interpretations. In Eqn. 20, the second term represents a delay in the thermal neutron buildup at the start of the pulse because of the finite epithermal slowing down time. Similarly, in Eqn. 21, the second term represents a period of increase in the thermal neutron population after the end of the burst, again because of the finite epithermal slowing down time.

The epithermal neutron pulse response is obtained similarly from Eqn. 17 for $0<t<t_e$:

$$\phi_{EPI-source\_pulse} = \int_0^t \Gamma A_1 e^{-\alpha_1 t}e^{(\alpha_1-\gamma)t'} + \ldots\, dt' \qquad \text{Eq. 23}$$

$$= \Gamma A_1 \frac{(e^{-\gamma t} - e^{-\alpha_1 t})}{(\alpha_1 - \gamma)} + \ldots$$

and for $t_e < t$:

$$\phi_{EPI-source\_pulse} = \int_0^{t_e} \Gamma A_1 e^{-\alpha_1 t}e^{(\alpha_1-\gamma)t'} + \ldots\, dt' \qquad \text{Eq. 24}$$

$$= \Gamma A_1 \frac{(e^{-\gamma t_e}e^{-\alpha_1(t-t_e)} - e^{-\alpha_1 t})}{(\alpha_1 - \gamma)} + \ldots$$

Equations 20-24 represent neutron fluxes but we are mostly interested in the detected gamma-ray fluxes. However, the thermal gamma-ray flux is nearly proportional to the thermal neutron flux and we can simply redefine B to include the proportionality constant: $B \rightarrow k_{\Sigma\_thermal}B^*$ where $B^*$ is the amplitude for thermal neutron flux and B is the amplitude for gamma-ray flux. Similarly, the epithermal capture gamma-ray flux is nearly proportional to the epithermal neutron flux: $A_1 \rightarrow k_{\Sigma\_epi}A_1^*$ and $A_2 \rightarrow k_{\Sigma\_epi}A_2^*$, where $A_1^*$, $A_2^*$ are the amplitudes for epithermal neutron flux and $A_1$, $A_2$ are the amplitudes for epithermal capture gamma-ray flux. Equations 20-24 can now be interpreted as representing the detected capture gamma-ray fluxes we are interested in.

The capture background during the burst interval is, in this approximation of a single thermal exponential decay rate ($\beta$), just the sum of Eqns. 20 and 23. However, when the thermal decay is examined at long decay times, there is typically a second much longer decay time. For practical purposes and as determined by fitting Monte Carlo data, this can be accommodated by adding a constant $\delta$ to Eqn. 20 for $0<t<t_e$:

$$\phi_{THERMAL-source\_pulse} =$$

$$\frac{\Gamma B\alpha_1 A_1}{(\alpha_1 - \beta)}\left[\frac{(e^{-\gamma t} - e^{-\beta t})}{(\beta - \gamma)} - \frac{(e^{-\gamma t} - e^{-\alpha_1 t})}{(\alpha_1 - \gamma)} + \delta\right] + \ldots \text{ and to Eqn. 21}$$

for $t_e < t$:

$$\phi_{THERMAL-source\_pulse} =$$

$$\frac{\Gamma B\alpha_1 A_1}{(\alpha_1 - \beta)}\left(\frac{e^{-\gamma t_e}e^{-\beta(t-t_e)} - e^{-\beta t}}{(\beta - \gamma)} - \frac{e^{-\gamma t_e}e^{-\alpha_1(t-t_e)} - e^{-\alpha_1 t}}{(\alpha_1 - \gamma)} + \delta\right) + \ldots$$

Inverse Model

The inverse model begins with the assumption that there is a time interval immediately before each burst where all of the neutrons have reached thermal energy and the epithermal part of the equations can be neglected. For a pulse width of 20 ms and a period of 100 µs as used in the RST, this should be valid for the "C-gate": 40-100 µs, which is the example used here. Other pulse widths, periods and gate values may also be used with equal validity. From Eqns. 21 and 22, the C-gate thermal capture gamma-ray flux is then:

$$\phi_{THERMAL-C\_gate} = \left[\frac{\Gamma B\alpha_1 A_1}{(\alpha_1 - \beta)}\frac{f_w(e^{-\gamma t_e}e^{\beta t_e} - 1)}{(\beta - \gamma)}\right][(e^{-\beta t} + \delta)] = \qquad \text{Eq. 25}$$

$$\Lambda(e^{-\beta t} + \delta)$$

i.e., an exponential decay with decay constant $\beta$, amplitude $$\Lambda \equiv \left[\frac{\Gamma B\alpha_1 A_1}{(\alpha_1 - \beta)}\frac{f_w(e^{-\gamma t_e}e^{\beta t_e} - 1)}{(\beta - \gamma)}\right],$$

and constant offset $\delta$. This equation is fit to the C-gate data to determine $\beta$ and $\Lambda$, where $\delta$ is assumed to be known through prior calibration (a description of this is given in the examples). Assuming that the neutron generator pulse output droop $\gamma$ is also known through calibration, the quantity $$\frac{\Gamma B\alpha_1 A_1}{(\alpha_1 - \beta)}$$

can then be calculated since all other factors in $$\frac{f_w(e^{-\gamma t_e}e^{\beta t_e} - 1)}{(\beta - \gamma)}$$

depend only on $\beta$ and the pulsing scheme.

The burst gate "A" and also gate "B" between the end of the burst and the start of the "C" gate contain both thermal and epithermal capture gamma-rays. For simplification, we will consider only the case of a single epithermal impulse exponential decay $A_1 e^{-\alpha_1 t}$, although the extension to multiple exponential decays is simple algebra. The B-gate capture gamma-ray flux is:

$$\phi_{B\_gate} = \Lambda(e^{-\beta t} + \delta) - \left[\frac{\Gamma B \alpha_1 A_1}{(\alpha_1 - \beta)}\right] \frac{(e^{(\alpha_1 - \gamma)t_e} - 1)}{(\alpha_1 - \gamma)} e^{-\alpha_1 t} + \Gamma A_1 \frac{(e^{(\alpha_1 - \gamma)t_e} - 1)}{(\alpha_1 - \gamma)} e^{-\alpha_1 t} \quad \text{Eq. 26}$$

The first term in Eqn 26 is the same as Eqn. 25 and represents the thermal capture flux if there were no epithermal effects. The second term in Eqn. 26 represents the epithermal neutrons right after the burst that have not yet decayed to thermal and modifies the thermal capture flux to account for this. The last term in Eqn. 26 represents the epithermal capture gamma-ray flux right after the burst. The last two terms partially cancel, the degree of cancellation depending on the coefficients $k_{\Sigma\_thermal}$ and $k_{\Sigma\_epi}$ and the decay times $\beta$ and $\alpha_1$. In other words, if the capture gamma-ray production for the epithermal neutrons after the burst is the same as gamma-ray production when they become thermal, the cancellation is complete. For the YAP scintillator the cancellation is almost complete, leaving mainly the first term in Eqn. 26. For scintillators like GSO, $A_1$ is large due to the large resonance integral in gadolinium and the third term in Eqn. 26 dominates the second term, giving the characteristic fast exponential decay at the end of the burst.

To calculate Eqn. 26, we must have two additional parameters: $\alpha_1$ and $\Gamma A_1$. The decay constant $\alpha_1$ is closely related to the slowing down time and is parameterized vs. the C-gate near/far ratio, which varies monotonically with hydrogen index. The ratio of the C-gate thermal amplitude $\Lambda$ and the epithermal amplitude $\Gamma A_1$ is weakly dependent on hydrogen index and is also parameterized vs. the C-gate near/far ratio. Together, these provide enough information to calculate Eqn. 26.

The A-gate capture flux is the sum of A-gate epithermal and thermal capture gamma-ray fluxes:

$$\phi_{A\_gate} = \frac{\Gamma B \alpha_1 A_1}{(\alpha_1 - \beta)} \left[ \frac{(e^{-\gamma t} - e^{-\beta t})}{(\beta - \gamma)} + \frac{(f_w - 1)(e^{-\gamma t_e} e^{\beta t_e} - 1)}{(\beta - \gamma)} e^{-\beta t} \right] + \left[ \Gamma A_1 - \frac{\Gamma B \alpha_1 A_1}{(\alpha_1 - \beta)} \right] \frac{(e^{-\gamma t} - e^{-\alpha_1 t})}{(\alpha_1 - \gamma)} + \frac{\Gamma B \alpha_1 A_1}{(\alpha_1 - \beta)} \frac{\delta}{\beta} \quad \text{Eq. 27}$$

The first term in Eqn 27 represents the exponential buildup of thermal neutrons and associated capture gamma-rays during the burst. The second term represents wraparound of thermal capture gamma-rays. The third and fourth terms represent the competing effects of epithermal capture and epithermal feed into thermal capture, as described previously. The last term represents the constant thermal capture term due to the inadequacies of a single-decay thermal exponential model. All quantities in Eqn. 27 are either measured from fitting the C-gate or determined from a parameterization vs. the C-gate near/far ratio. From Eqn. 27, the total A-gate capture gamma-ray count is integrated and, when this total is subtracted from the total A-gate integral, the remainder is the desired quantity; i.e., the inelastic count during the burst.

To summarize, the inverse model has the following parameters:
$t_e$ Burst duration
$t_p$ Burst period
$\gamma$ Neutron burst "droop" factor
$\delta$ Constant thermal capture gamma-ray component
$\alpha_1$ Epithermal capture gamma-ray exponential decay constant
$\Gamma A_1$ Epithermal capture gamma-ray amplitude
$\beta$ Thermal capture gamma-ray exponential decay constant
$\Lambda$ Thermal C-gate capture gamma-ray amplitude The first two parameters are set by the electronics. The neutron burst droop factor is a characteristic of the neutron generator and should be constant for a given neutron generator design. The next three quantities are determined by fitting MCNP data for several hydrogen indices and parameterizing as a function of the C-gate near/far ratio (or, alternately, against some other hydrogen index sensitive quantity). From the parameterization, the quantities are then evaluated for any given C-gate near/far ratio. The final two parameters are determined by fitting an exponential to the C-gate data.

EXAMPLE

RST Monte Carlo Data

This example is for Schlumberger's RST™ tool, which has two detectors, a "near" and a "far". The formation examples include 0 pu, 18 pu and 34 pu water-filled pores and 18 pu 0.15 g/cc $CH_4$ filled pores. The hydrogen indices of these examples are 0, 0.18, 0.34 and 0.061, respectively. This example assumes a constant neutron generator pulse spectrum (i.e., $\gamma=0$).

Inelastic, epithermal and thermal MCS gamma-ray spectra were derived from MCNP calculations with three different neutron cutoff energies: 0.1 MeV, 0.4 eV, and 0 eV. By subtracting the MCS spectrum with 0.4 eV cutoff from the 0.0 eV cutoff, the thermal capture gamma-ray spectrum was obtained. By subtracting the 0.1 MeV cutoff spectrum from the 0.4 eV cutoff spectrum, the epithermal capture gamma-ray spectrum was obtained. The 0.1 MeV neutron cutoff spectrum represents the inelastic gamma-ray spectrum. By appropriate time binning of the MCNP data, both impulse (i.e., assuming all 14 MeV neutrons injected at time t=0) and neutron burst MCS spectra were obtained, both with and without wraparound. These data were used to parameterize $\delta$, $\alpha_1$, and $\Gamma A_1$. In the interest of keeping computing time to a manageable level, these calculations do not include detector pulse height effects. The gamma-ray energies were cut off below 0.15 MeV.

Figure 12:
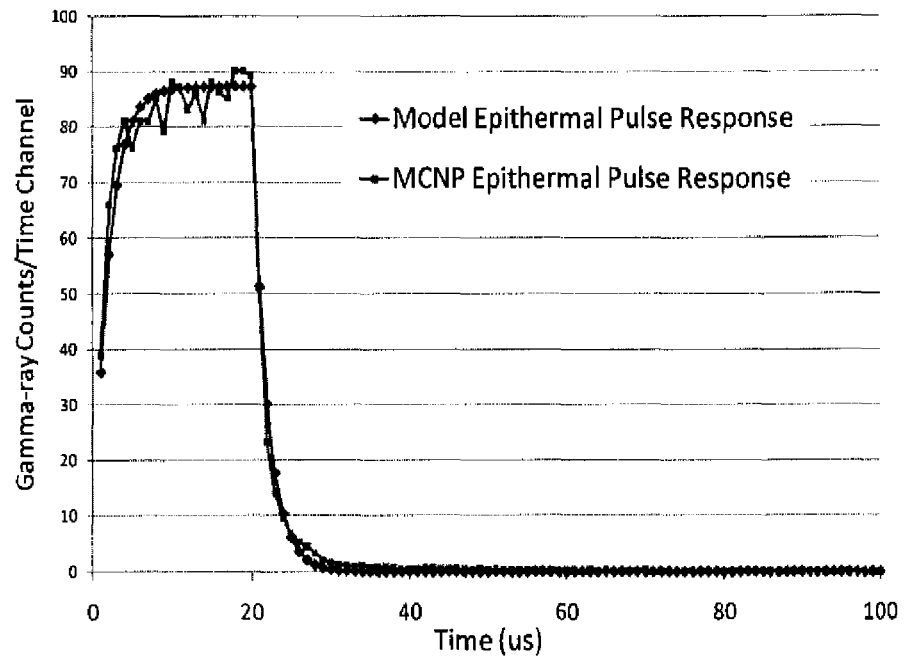
FIG. 12 shows Epithermal burst (pulse) response for RST near detector. The decay time $\alpha_1$ is adjusted to reproduce the rise and fall times of the pulse.

FIG. 11 shows the epithermal gamma-ray impulse spectrum for the "near" GSO detector in a 0 pu sandstone formation. There are at least two decay rates in this spectrum, as shown by the exponential trend lines. However, since one of the decay rates is much lower in amplitude than the other, a single exponential with a short time constant was found to suffice. The time constant $\alpha_1$ of this exponential and the epithermal amplitude $\Gamma A_1$ were determined by fitting the MCNP epithermal pulse MCS spectrum (FIG. 12).

Figure 13:
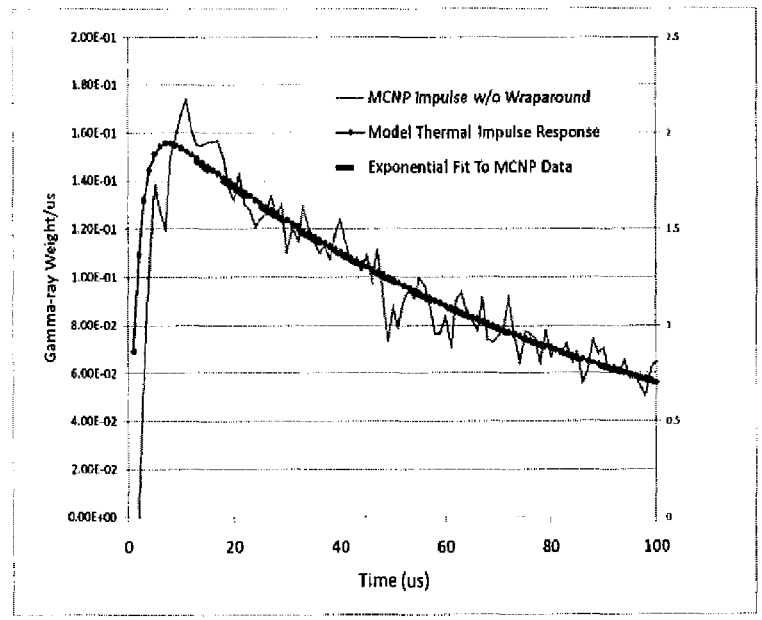
FIG. 13 shows the Thermal impulse response.
Figure 14:
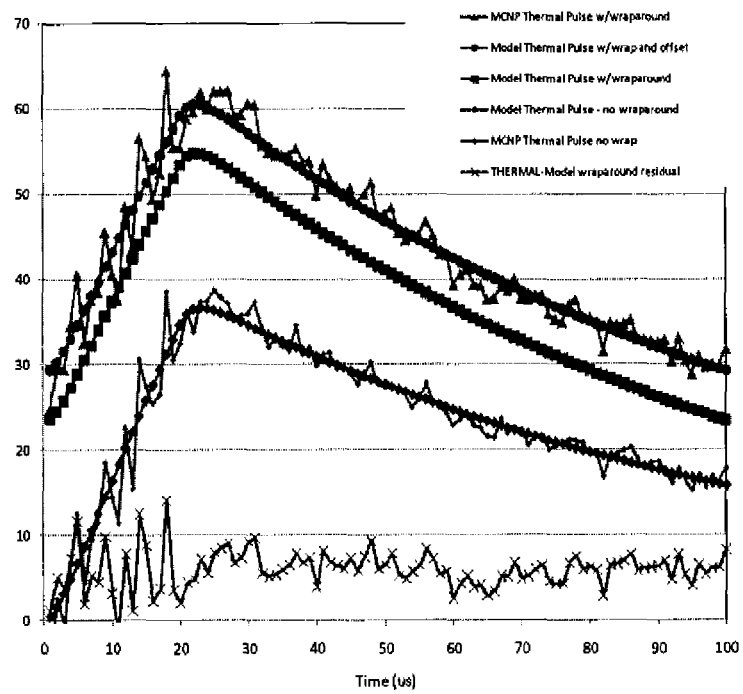
FIG. 14 shows MCNP thermal pulse data and model thermal pulse calculation.
Figure 15:
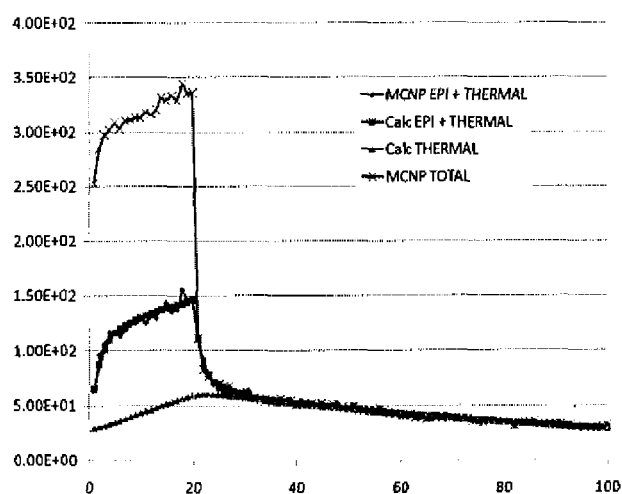
FIG. 15 shows comparison of model and MCNP calculations of the sum of thermal and epithermal capture gamma-rays.
Figure 16:
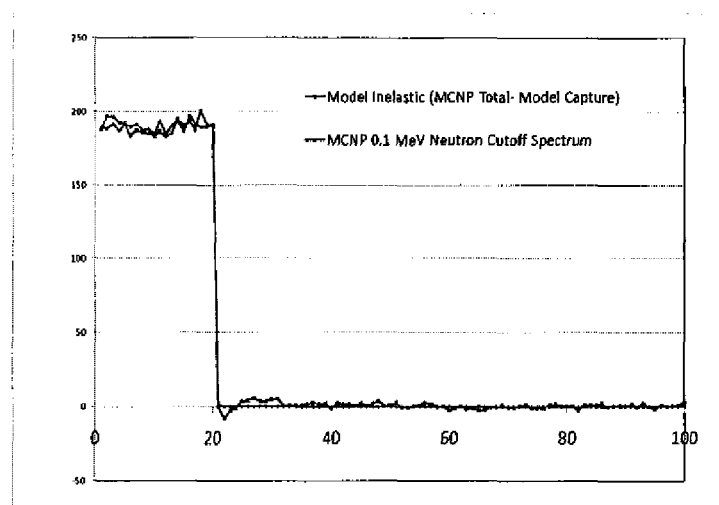
FIG. 16 shows comparison of "inelastic" MCS spectra from the MCNP 0.1 MeV neutron cutoff calculation and the model version derived by subtracting the sum of the model epithermal and thermal capture spectra from the MCNP total spectrum.

The two thermal quantities $\beta$ and $\Lambda$ were determined by fitting the late-time part of the MCNP thermal impulse spectrum (FIG. 13). These quantities are used with Eqns. 20, 21, 22 to calculate the thermal pulse response illustrated by the red curve in FIG. 14. This model calculation is different from the MCNP calculation by a constant offset value (maroon curve in FIG. 14). The quantity δ is calibrated to eliminate this offset with the result shown by the yellow curve in FIG. 16.

Figure 17:
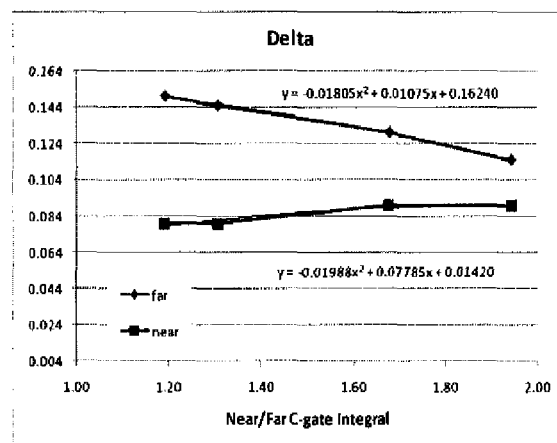
FIG. 17 shows offset δ parameterized as a function of C-gate near/far ratio.

The sum of the model thermal and epithermal pulse calculations represent the capture gamma-ray flux both during and after the burst (FIG. 17). Finally, the inelastic gamma-ray spectrum is the remainder when the model capture (epithermal+thermal) spectrum is subtracted from the MCNP total spectrum. This remainder is plotted in FIG. 18 against the MCNP 0.1 MeV neutron cutoff gamma-ray spectrum (representing the pure inelastic spectrum), showing good agreement. The small disagreement after the burst is caused by neglecting the longer time constant exponential in the epithermal gamma-ray impulse spectrum. This does not significantly affect the inelastic count.

Figure 18:
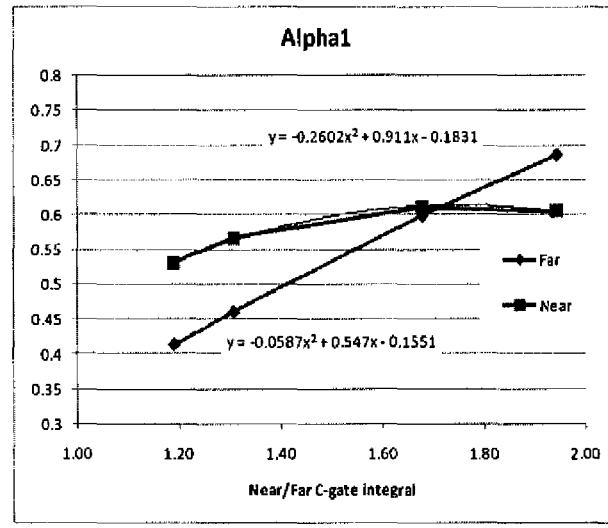
FIG. 18 shows quantity $\alpha_1$ parameterized as a function of the C-gate near/far ratio.
Figure 19:
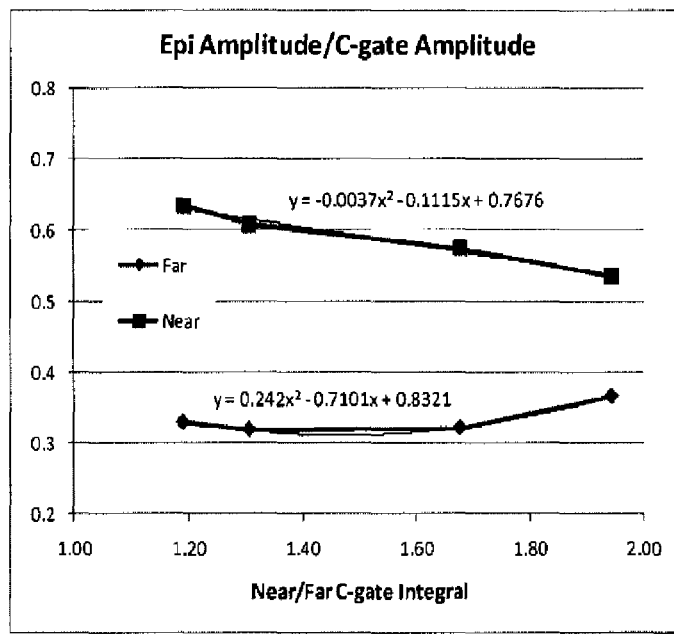
FIG. 19 shows Quantity $$\frac{\Gamma A_1}{\Lambda}$$

In order for the model to apply to any given hydrogen index, quantities δ, $\alpha_1$ and $$\frac{\Gamma A_1}{\Lambda}$$

are parameterized vs. the C-gate integral near/far ratio (FIGS. 17, 18 and 19). The epithermal capture amplitude $\Gamma A_1$ is determined by multiplying the quantity $\Lambda$ determined from the C-gate exponential fit by the quantity $$\frac{\Gamma A_1}{\Lambda}$$

parameterized in FIG. 19.

For reference, the C-gate near/far ratio is closely associated with the hydrogen index (FIG. 20).

The critical quantity is the integral of these derived inelastic spectra over the entire burst. A comparison of far/near ratio of the inelastic count for the four different modeled formations is shown in FIG. 21. This figure shows the results directly from MCNP as well as the modeled derived values. The small discrepancies between model and direct MCNP data are mainly due to the fitting errors in the parameterizations shown in FIGS. 17, 18 and 19.

Log Example

RST Data

The inverse model has been applied to an RST log example in a gas well. Examples of the capture background calculated according to this invention are shown in FIGS. 22-24. The far/near inelastic ratio log generated after capture background subtraction is shown in FIG. 25 along with an ELAN open-hole log interpretation. The peaks in the far/near inelastic ratio log indicate gas and show similarities and some differences with the open-hole interpretation. The differences may be due to fluid movement and annular gas in the cased-hole log compared to the situation in the open-hole log.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method, comprising:
disposing a logging tool in a borehole in a formation, the logging tool comprising a pulsed neutron source, and a gamma-ray detector configured to detect counts of inelastic gamma-rays that form when neutrons are inelastically scattered by the formation;
emitting a burst of neutrons into the formation with the pulsed neutron source;
determining an epithermal neutron capture count for the burst, and
determining stand-off of the logging tool based on a slowing-down-time of the epithermal neutron capture count.

2. The method according to claim 1, further comprising subtracting the epithermal neutron capture count from a total count rate to determine a pure inelastic gamma-ray signal relating to density of the formation.

3. The method according to claim 1, further comprising computing a hydrogen index measurement based on the epithermal neutron capture count.

4. The method according to claim 1, further comprising computing a neutron porosity measurement based on the epithermal neutron capture count.

5. The method according to claim 1, wherein the neutrons emitted have an energy level of at least 2 MeV.

6. The method according to claim 1, wherein disposing the logging tool in the borehole comprises conveying the logging tool on a wireline, a slickline, coiled tubing, or a drillstring in logging-while-drilling operations.

7. The method according to claim 1, wherein determining the epithermal neutron capture count for the burst is based on a rate of thermal creation for the burst.

8. The method according to claim 1, wherein determining the epithermal neutron capture count for the burst further comprises fitting a sum of exponentials with a plurality of amplitudes and decay times for an "off" interval following the burst to construct the epithermal neutron capture for the burst.

9. The method according to claim 1, wherein determining the epithermal neutron capture count for the burst further comprises fitting a square pulse for an "on" interval for the burst and a first exponential build-up function relating to an epithermal neutron capture component of a total count rate and a second exponential build-up function relating to a thermal neutron capture component of the total count rate.

10. The method according to claim 1, wherein determining the epithermal neutron capture count for the burst is based on a total thermal count rate.

11. The method according to claim 1, wherein determining the epithermal neutron capture count for the burst further comprises fitting predetermined spectra for each element of the formation that will contribute inelastic gamma-rays to a spectra obtained during the burst and subtracting out the spectra contributed by each element of the formation to result in a fraction of the spectra obtained during the burst that is due to epithermal capture.

12. A method, comprising:
disposing a logging tool in a borehole in a formation, the logging tool comprising a pulsed neutron source, and a gamma-ray detector configured to detect counts of inelastic gamma-rays that form when neutrons are inelastically scattered by the formation;
emitting a burst of neutrons into the formation with the pulsed neutron source; and determining an epithermal neutron capture count for the burst based on a rate of thermal creation for the burst or a total thermal count rate.

13. The method according to claim 12, further comprising subtracting the epithermal neutron capture count from a total count rate to determine a pure inelastic gamma-ray signal relating to density of the formation.

14. The method according to claim 12, further comprising determining stand-off of the logging tool based on a slowing-down-time of the epithermal neutron capture count.

15. The method according to claim 12, further comprising computing a hydrogen index measurement and/or a neutron porosity measurement based on the epithermal neutron capture count.

16. A method, comprising:
  disposing a logging tool in a borehole in a formation, the logging tool comprising a pulsed neutron source, and a gamma-ray detector configured to detect counts of inelastic gamma-rays that form when neutrons are inelastically scattered by the formation;
  emitting a burst of neutrons into the formation with the pulsed neutron source; and
  determining an epithermal neutron capture count for the burst by one or more of:
    fitting a sum of exponentials with a plurality of amplitudes and decay times for an "off" interval following the burst to construct the epithermal neutron capture for the burst;
    fitting a square pulse for an "on" interval for the burst and a first exponential build-up function relating to an epithermal neutron capture component of a total count rate and a second exponential build-up function relating to a thermal neutron capture component of the total count rate; and
    fitting predetermined spectra for each element of the formation that will contribute inelastic gamma-rays to a spectra obtained during the burst and subtracting out the spectra contributed by each element of the formation to result in a fraction of the spectra obtained during the burst that is due to epithermal capture.

17. The method according to claim 16, further comprising subtracting the epithermal neutron capture count from a total count rate to determine a pure inelastic gamma-ray signal relating to density of the formation.

18. The method according to claim 16, further comprising determining stand-off of the logging tool based on a slowing-down-time of the epithermal neutron capture count.

19. The method according to claim 16, further comprising computing a hydrogen index measurement and/or a neutron porosity measurement based on the epithermal neutron capture count.

* * * * *